(12) United States Patent
Matsui et al.

(10) Patent No.: US 11,977,225 B2
(45) Date of Patent: May 7, 2024

(54) VEHICLE DISPLAY CONTROL DEVICE AND VEHICLE DISPLAY CONTROL METHOD FOR RECOGNIZING TRAFFIC REGULATION MARKS AND DISPLAYING TRAFFIC REGULATION INFORMATION

(71) Applicant: PANASONIC INTELLECTUAL PROPERTY MANAGEMENT CO., LTD., Osaka (JP)

(72) Inventors: Kenji Matsui, Tokyo To (JP); Masato Noguchi, Nara Ken (JP); Nobutoshi Higaki, Kyoto Fu (JP); Kazuomi Kato, Kyoto Fu (JP); Tetsuji Yamamoto, Osaka Fu (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 163 days.

(21) Appl. No.: 17/590,205

(22) Filed: Feb. 1, 2022

(65) Prior Publication Data
US 2022/0317443 A1 Oct. 6, 2022

(30) Foreign Application Priority Data
Mar. 30, 2021 (JP) .................................. 2021-058712

(51) Int. Cl.
*G02B 27/01* (2006.01)
*B60K 35/00* (2006.01)
*B60K 35/23* (2024.01)
*B60K 35/28* (2024.01)
*B60K 35/29* (2024.01)
(Continued)

(52) U.S. Cl.
CPC .......... *G02B 27/0101* (2013.01); *B60K 35/00* (2013.01); *G06F 3/14* (2013.01); *G06V 20/582* (2022.01); *G06V 20/588* (2022.01); *B60K 35/23* (2024.01); *B60K 35/28* (2024.01); *B60K 35/29* (2024.01); *B60K 35/81* (2024.01);
(Continued)

(58) Field of Classification Search
None
See application file for complete search history.

(56) References Cited

U.S. PATENT DOCUMENTS 9,697,430 B2 * 7/2017 Kristensen ........... G06V 20/582
10,872,586 B2 12/2020 Koyama
(Continued)

FOREIGN PATENT DOCUMENTS

JP 2018-156574 10/2018

*Primary Examiner* — Jason A Pringle-Parker
(74) *Attorney, Agent, or Firm* — Greenblum and Bernstein, P.L.C.

(57) ABSTRACT

A vehicle display control device includes a memory and a processor coupled to the memory. The processor is configured to: recognize a traffic regulation mark provided on a traveling path of a car, the traffic regulation mark indicating traffic regulation; specify a valid regulation range used as a valid range of regulation indicated by the traffic regulation mark based on the recognized traffic regulation mark; and control a display device mounted on the car to display regulations information on a display area, the regulations information including contents of regulation indicated by the recognized traffic regulation mark. The processor is configured to switch displaying the regulations information into another upon satisfying a predetermined condition in a case where the valid regulation range is not specified.

17 Claims, 13 Drawing Sheets

(51) Int. Cl.
   *B60K 35/81* (2024.01)
   *G06F 3/14* (2006.01)
   *G06V 20/56* (2022.01)
   *G06V 20/58* (2022.01)

(52) U.S. Cl.
   CPC .. *B60K 2360/169* (2024.01); *B60K 2360/182* (2024.01); *G02B 2027/014* (2013.01)

(56) References Cited

U.S. PATENT DOCUMENTS

| | | | |
|---|---|---|---|
| 2010/0207787 A1* | 8/2010 | Catten | G08G 1/096716 340/905 |
| 2011/0037618 A1* | 2/2011 | Ginsberg | G08G 1/096775 340/905 |
| 2011/0215951 A1* | 9/2011 | Yamashita | G01C 21/26 340/995.19 |
| 2014/0119605 A1* | 5/2014 | Zobel | G08G 1/09623 382/103 |
| 2017/0053534 A1* | 2/2017 | Lokesh | H04L 67/12 |
| 2017/0127237 A1* | 5/2017 | Hayee | G01S 19/51 |
| 2017/0178591 A1* | 6/2017 | Takatsudo | B60R 1/00 |
| 2020/0193194 A1* | 6/2020 | Zhang | G06F 18/217 |
| 2021/0074247 A1* | 3/2021 | Koyama | G09G 5/14 |

\* cited by examiner

FIG.9
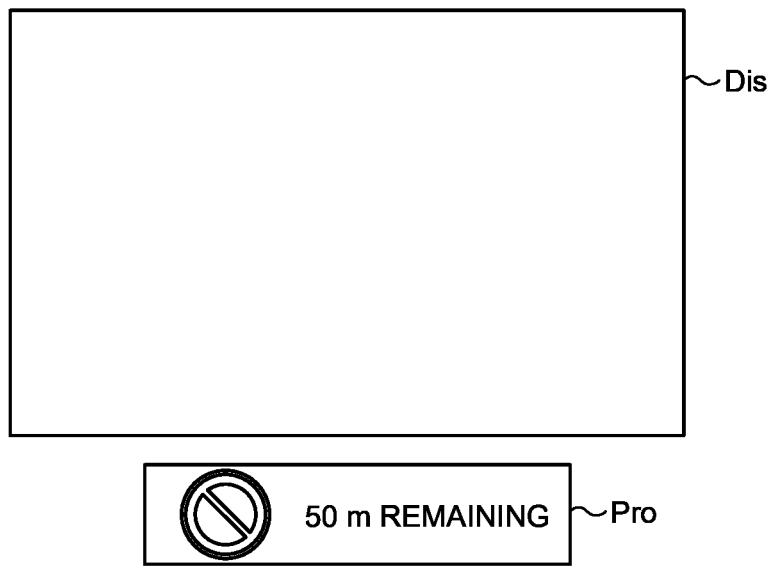
FIG.10
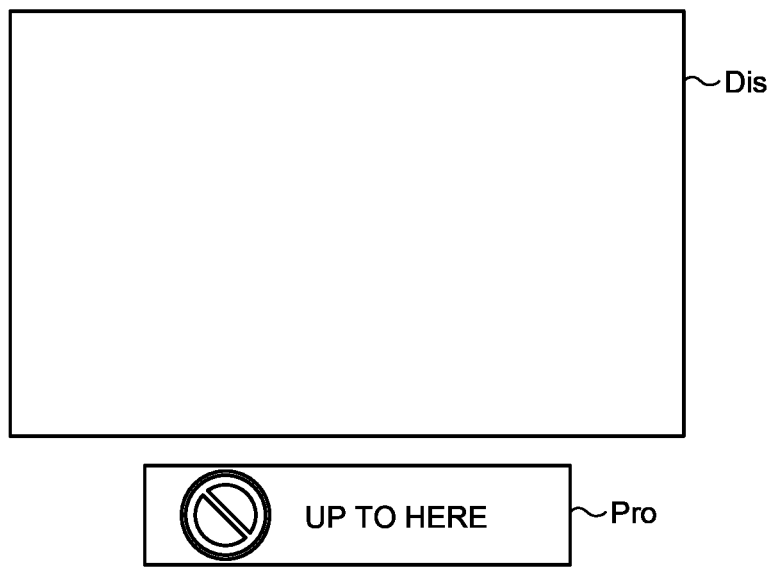

VEHICLE DISPLAY CONTROL DEVICE AND VEHICLE DISPLAY CONTROL METHOD FOR RECOGNIZING TRAFFIC REGULATION MARKS AND DISPLAYING TRAFFIC REGULATION INFORMATION

CROSS-REFERENCE TO RELATED APPLICATIONS

This application is based upon and claims the benefit of priority from Japanese Patent Application No. 2021-058712, filed on Mar. 30, 2021, the entire contents of which are incorporated herein by reference.

FIELD

Embodiments described herein relate generally to a vehicle display control device and a vehicle display control method.

BACKGROUND

Conventionally, there has been known a vehicle display control device that displays content of regulation indicated by a traffic regulation mark. For example, Japanese Patent Application Laid-open No. 2018-156574 discloses a vehicle display control device that, when a car enters a valid range of a regulation indicated by a traffic regulation mark, displays in a display area regulations information indicating content of the regulation in the valid range and residual amount information indicating a residual amount specified by a residual amount specifying module. Furthermore, for example, Japanese Patent Application Laid-open No. 2018-156574 discloses that a display area in which residual amount information is displayed is switched depending on a situation of a car with respect to a valid range.

However, when the end position of the valid range of the regulation cannot be recognized, there is a possibility that the regulations information and the residual amount information will continue to be displayed even if the car leaves the valid range of the regulation.

The present disclosure has been made to solve the above problems, and provides a vehicle display control device and a vehicle display control method capable of appropriately displaying regulations information.

SUMMARY

A vehicle display control device according to an embodiment of the present disclosure includes a memory and a processor coupled to the memory. The processor is configured to: recognize a traffic regulation mark provided on a traveling path of a car, the traffic regulation mark indicating traffic regulation; specify a valid regulation range used as a valid range of regulation indicated by the traffic regulation mark based on the recognized traffic regulation mark; and control a display device mounted on the car to display regulations information on a display area, the regulations information including contents of regulation indicated by the recognized traffic regulation mark. The processor is configured to switch displaying the regulations information into another upon satisfying a predetermined condition in a case where the valid regulation range is not specified.

A vehicle display control method according to the embodiment of the present disclosure includes: recognizing a traffic regulation mark provided on a traveling path of a car, the traffic regulation mark indicating traffic regulation; specifying a valid regulation range used as a valid range of regulation indicated by the traffic regulation mark based on the traffic regulation mark recognized in the recognizing; and controlling a display device mounted on the car to display regulations information on a display area, the regulations information including contents of regulation indicated by the traffic regulation mark recognized in the recognizing. The controlling includes switching displaying the regulations information into another upon satisfying a predetermined condition in a case where the valid regulation range is not specified in the specifying.

BRIEF DESCRIPTION OF THE DRAWINGS

FIG. 9 is a diagram illustrating an example of display of regulations information and residual amount information in the proximal display area and the distal display area at a vehicle position P2 in FIG. 6;

FIG. 10 is a diagram illustrating an example of display of regulations information and residual amount information in the proximal display area and the distal display area at a vehicle position P3 in FIG. 6;

DETAILED DESCRIPTION

Hereinafter, embodiments will be described in detail with reference to the drawings as appropriate. However, unnecessarily detailed description may be omitted. For example, a detailed description of a well-known matter and a repeated description of substantially the same configuration may be omitted. This is to avoid unnecessary redundancy of the following description and to facilitate understanding of those skilled in the art.

Note that the accompanying drawings and the following description are provided for those skilled in the art to fully understand the present disclosure, and are not intended to limit the subject matter described in the claims.

Embodiment

An embodiment will be described below with reference to FIGS. 1 to 21.

Schematic Configuration of Vehicle System 1

Figure 1:
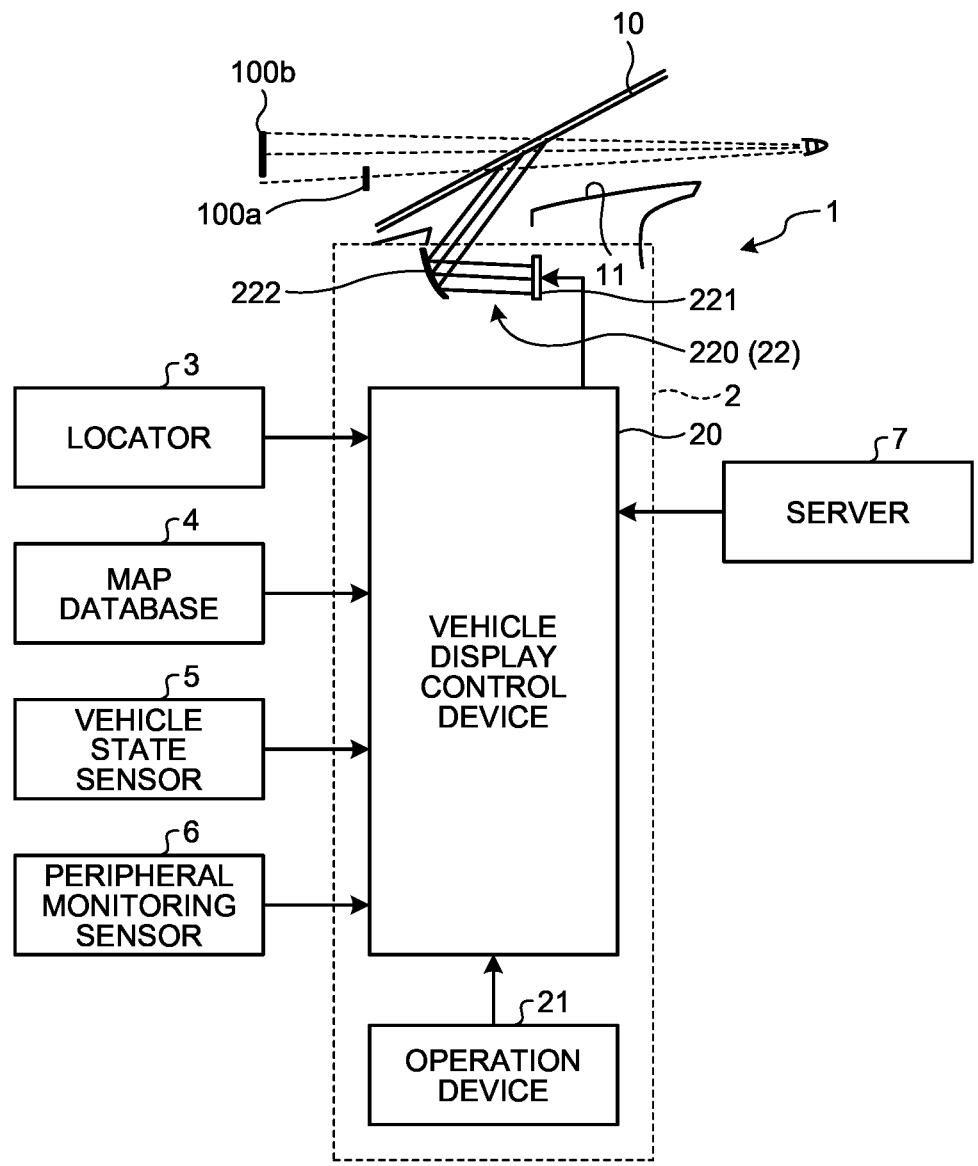
FIG. 1 is a diagram illustrating an example of a configuration of a vehicle system according to an embodiment.

First, a configuration of a vehicle system 1 according to the present embodiment will be described with reference to FIG. 1. FIG. 1 is a diagram illustrating an example of a configuration of the vehicle system 1 according to the embodiment. The vehicle system 1 is used in a vehicle such as an automobile, and includes a human machine interface (HMI) system 2, a locator 3, a map database 4, a vehicle state sensor 5, a peripheral monitoring sensor 6, and a server 7. It is assumed that the HMI system 2, the locator 3, the map database 4, the vehicle state sensor 5, the peripheral monitoring sensor 6, and the server 7 are connected to, for example, an in-vehicle local area network (LAN). Hereinafter, a vehicle using the vehicle system 1 is referred to as the car.

The locator 3 includes a global navigation satellite system (GNSS) receiver (not illustrated) and an inertial sensor (not illustrated). The GNSS receiver receives positioning signals from a plurality of artificial satellites. The inertial sensor includes, for example, a three-axis gyro sensor and a three-axis acceleration sensor. The locator 3 sequentially measures a vehicle position of the car on which the locator 3 is mounted by combining a positioning signal received by the GNSS receiver and a measurement result of the inertial sensor. Note that the locator 3 may measure the vehicle position of the car using a travel distance obtained from signals sequentially output from a vehicle speed sensor mounted on the car.

The map database 4 is a nonvolatile memory and stores map data such as link data and node data. The link data includes data such as a link ID for specifying a link, a link length indicating a length of the link, a link orientation, a link travel time, link shape information, node coordinates (latitude/longitude) between a start point and an end point of the link, and a road attribute. It is assumed that the data of the road attribute includes, for example, data about a regulation by a traffic regulation mark which is at least one of a road sign and a road mark (hereinafter, referred to as regulation data). Examples of the regulation include speed limit, parking prohibition, passing prohibition, and vehicle crossing prohibition. In addition, in a case where there is a valid range in the regulation by the traffic regulation mark, data of this valid range (hereinafter, referred to as valid range data) is also included. Note that the regulation data and the valid range data may be stored in the map database 4 as data other than the link data. The node data includes data such as a node ID to which a unique number is assigned for each node on a map, node coordinates, a node name, a node type, a connection link ID in which a link ID of a link connected to a node is described, and an intersection type.

The vehicle state sensor 5 is a sensor group for detecting a traveling state of the car. Examples of the vehicle state sensor 5 include a vehicle speed sensor or the like that detects a vehicle speed of the car. The vehicle state sensor 5 outputs the detection result to the in-vehicle LAN. Note that the detection result of the vehicle state sensor 5 may be output to the in-vehicle LAN via an electronic control unit (ECU) mounted on the car.

The peripheral monitoring sensor 6 recognizes a travel environment of the car. The peripheral monitoring sensor 6 detects an obstacle such as a stationary object or a moving object around the car, and detects a road mark such as a road sign or a traveling lane. As the peripheral monitoring sensor 6, a front camera having an imaging range that is a predetermined range in front of the car may be used. For example, the front camera may be provided in a rearview mirror of the car. The front camera may be provided on the upper surface of an instrument panel 11 of the car. As the peripheral monitoring sensor 6, a camera that captures an image other than the front of the car may be used, or a millimeter-wave radar, sonar, light detection and ranging (LiDAR), or the like may be used.

The HMI system 2 includes a vehicle display control device 20, an operation device 21, and a display device 22, and receives an input operation from a driver of the car and presents information to the driver of the car. The operation device 21 is a group of switches operated by a driver of the car. The operation device 21 is used to perform various settings. Examples of the operation device 21 include a steering switch provided on a spoke unit of the steering of the car. Note that the driver is an example of a "user" in the claims.

The display device 22 presents information to the driver by displaying information on the basis of an instruction from the vehicle display control device 20. Examples of the display device 22 include a head-up display (HUD) 220, a combination meter, a center information display (CID), and the like. The HUD 220 projects light of a display image based on image data acquired from the vehicle display control device 20 onto a projection area in front of the driver's seat of the car, thereby displaying a virtual image of the display image to be superimposed on a part of the foreground so that the driver can visually recognize the virtual image. The combination meter and the CID display information by, for example, a liquid crystal display. The combination meter is disposed on the instrument panel 11 in front of the driver's seat. The CID is disposed above the center cluster.

In the present embodiment, in particular, the following description will be given using an example of a case of using the HUD 220, as the display device 22, capable of displaying virtual images of respective display images so as to be visually recognized by the driver by projecting the display images onto two projection regions having different positions.

As illustrated in FIG. 1, the HUD 220 is provided on the instrument panel 11 of the car. The HUD 220 projects a display image formed by, for example, a liquid crystal or scanning projector 221 onto a predetermined projection area of a windshield 10 as a projection member through an optical system 222 such as a concave mirror, for example. The projector 221 projects a plurality of display images onto two projection areas at different positions by different optical paths. The light flux of the display image reflected toward the vehicle interior by the windshield 10 is perceived by the driver seated on the driver's seat. The driver sitting on the driver's seat also perceives the light flux from the foreground as a landscape existing in front of the car, the light flux having passed through the windshield 10 made of translucent glass. Consequently, the driver can visually recognize virtual images 100a and 100b of the plurality of display images formed in front of the windshield 10 while overlapping a part of the foreground. That is, the HUD 220 superimposes and displays the virtual images 100a and 100b on the foreground of the car to realize so-called augmented reality (AR) display. The projection member on which the HUD 220 projects the display image is not limited to the windshield 10, but may be a translucent combiner or the like.

As illustrated in FIG. 1, the virtual image displayed by the HUD 220 includes a proximal virtual image 100a and a distal virtual image 100b. Each of a range in which the proximal virtual image 100a can be displayed (hereinafter, referred to as a proximal display area) and a range in which the distal virtual image 100b can be displayed (hereinafter, referred to as a distal display area) has a horizontally long rectangular shape in which sides in the vehicle width direction are longer. The size of the distal display area is set to be larger than the size of the proximal display area.

In addition, the proximal virtual image 100a and the distal virtual image 100b are formed at different positions in the front-rear direction of the car when visually recognized by the driver. The proximal virtual image 100a is formed at a position closer to the windshield 10 than the distal virtual image 100b. Furthermore, the proximal virtual image 100a and the distal virtual image 100b are also formed at positions shifted in the vertical direction for visual recognition by the driver. In other words, the proximal virtual image 100a and the distal virtual image 100b are also formed at positions shifted in the vertical direction. Specifically, the imaging position of the proximal virtual image 100a is set to be lower than the imaging position of the distal virtual image 100b. In addition, the image forming position of the distal virtual image 100b is preferably set to be approximately the same height as the eye point of the driver for visual recognition of the driver, for example, as illustrated in FIG. 1.

Note that, for visual recognition of the driver, the lower edge portion of the distal virtual image 100b may be positioned below the upper edge portion of the proximal virtual image 100a. For example, the distal display area may be partially cut-away rectangular so as to avoid the proximal display area. In addition, the lower side of the distal display area and the upper side of the proximal display area may be separated in the vertical direction.

The vehicle display control device 20 mainly includes a microcomputer including a processor, a computer-readable non-transitory recording medium such as a volatile memory and a nonvolatile memory, an I/O, and a bus that connects these. The vehicle display control device 20 is connected to the operation device 21, the display device 22, and the in-vehicle LAN. The vehicle display control device 20 executes various processes by executing a control program stored in the nonvolatile memory. For example, the vehicle display control device 20 controls display by the HUD 220. The functional configuration of the vehicle display control device 20 related to display control by the HUD 220 will be described in detail later.

Schematic Configuration of Vehicle Display Control Device 20

Figure 2:
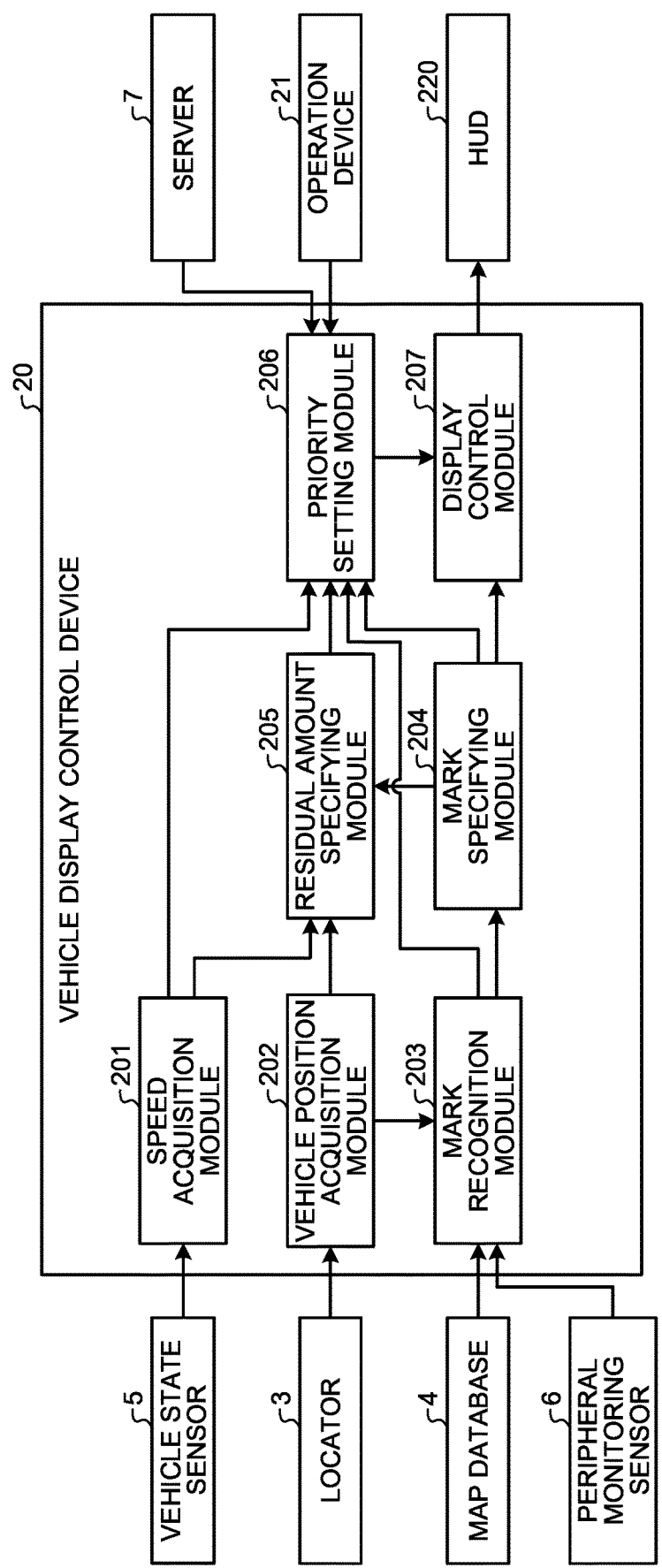
FIG. 2 is a block diagram illustrating an example of a functional configuration of a vehicle display control device according to the embodiment.

Next, a functional configuration of the vehicle display control device 20 according to the present embodiment will be described with reference to FIG. 2. FIG. 2 is a block diagram illustrating an example of a functional configuration of the vehicle display control device 20 according to the embodiment.

As illustrated in FIG. 2, the vehicle display control device 20 has functions as a speed acquisition module 201, a vehicle position acquisition module 202, a mark recognition module 203, a mark specifying module 204, a residual amount specifying module 205, a priority setting module 206, and a display control module 207 with respect to display control by the HUD 220. A part or all of the functions executed by the vehicle display control device 20 may be configured as hardware by one or a plurality of ICs or the like. A part or all of the functions of the vehicle display control device 20 may be realized by a combination of execution of software by a processor and a hardware member.

The speed acquisition module 201 acquires the speed of the car from the vehicle speed sensor among the vehicle state sensors 5. The vehicle position acquisition module 202 acquires the vehicle position of the car measured by the locator 3. The mark recognition module 203 recognizes the traffic regulation mark present ahead in the traveling path of the car, and the mark specifying module 204 specifies the valid range of the regulation indicated by the traffic regulation mark. The traffic regulation mark may be a road sign or a road mark as long as the regulation has a valid range. However, in the present embodiment, the following description will be given using an example of a case where a road sign indicating a regulation for prohibiting or designating a specific traffic method is used as the traffic regulation mark.

The mark recognition module 203 determines, from the vehicle position of the car acquired by the vehicle position acquisition module 202 and the above-described regulation data among the map data stored in the map database 4, whether there is regulation data associated with a link ahead in the traveling path of the car. In a case where there is regulation data associated with a link ahead in the traveling path of the car, the mark recognition module 203 recognizes the traffic regulation mark indicated by the regulation data as the traffic regulation mark present ahead in the traveling path of the car. The mark recognition module 203 corresponds to a "regulation recognition module" in the claims.

In addition, the mark recognition module 203 recognizes the travel environment of the car from the detection result of the peripheral monitoring sensor 6. For example, the mark recognition module 203 recognizes a traffic regulation mark or recognizes the presence or absence of a preceding vehicle from a captured image acquired from the front camera (hereinafter, referred to as a front image) using an image recognition process such as pattern matching. The recognition of the traffic regulation mark by the mark recognition module 203 preferably includes recognition of the content of an auxiliary sign of the traffic regulation mark in addition to the content of the regulation indicated by the traffic regulation mark. The content of the auxiliary sign may be recognized using pattern matching or a character string detection technique. In a case where the traffic regulation mark can be recognized from the front image, the mark recognition module 203 may recognize the traffic regulation mark as a traffic regulation mark existing in front of the traveling path of the car.

In a case where the mark recognition module 203 recognizes a traffic regulation mark present ahead on the traveling path of the car, the mark specifying module 204 specifies the valid range of the regulation indicated by the traffic regulation mark (hereinafter, referred to as the valid regulation range). Therefore, the mark specifying module 204 corresponds to an "valid range specifying module" in the claims. The mark specifying module 204 may be configured to specify the valid regulation range from the above-described valid range data among the map data stored in the map database 4. In addition, the mark specifying module 204 may be configured to specify the valid regulation range from the content of the auxiliary sign in a case where the content of the auxiliary sign among the traffic regulation marks are recognized by the mark recognition module 203 from the front image acquired from the front camera. For example, in a case where the mark recognition module 203 recognizes the content of the auxiliary sign such as "100 m ahead", the mark specifying module 204 may specify the valid regulation range as 100 m.

The residual amount specifying module 205 specifies a residual amount required from the vehicle position of the car to the start position of the valid regulation range (hereinafter, referred to as a start residual amount), and specifies a residual amount required from the vehicle position of the car to the end position of the valid regulation range (hereinafter, referred to as an end residual amount). As an example, the residual amount specifying module 205 specifies the start residual amount in a case where the distance from the vehicle position of the car to the start position of the valid regulation range is equal to or less than a set value that can be arbitrarily set. The distance from the vehicle position of the car to the start position of the valid regulation range may be calculated from the vehicle position of the car acquired by the vehicle position acquisition module 202 and the map data stored in the map database 4. Alternatively, the residual amount specifying module 205 may use the distance from the car to the start position of the valid regulation range specified by the mark specifying module 204. In this case, the residual amount specifying module 205 may specify the start position of the valid regulation range from the fact that the mark specifying module 204 has recognized the content of the auxiliary sign such as "from here" indicating the start position of the valid regulation range. Note that the residual amount specifying module 205 may be configured to sequentially specify the start residual amount until the car enters the valid regulation range, or may be configured to specify the start residual amount once in a case where the distance from the vehicle position of the car to the start position of the valid regulation range becomes equal to or less than a set value that can be arbitrarily set.

In addition, the residual amount specifying module 205 may start specifying the end residual amount when the car enters the valid regulation range. The residual amount specifying module 205 may determine that the car has entered the valid regulation range from the fact that the mark specifying module 204 specifies the content of the auxiliary sign such as "from here" indicating the start position of the valid regulation range. In addition, the residual amount specifying module 205 may determine that the car has entered the valid regulation range from the vehicle position of the car and the valid range data of the map data. As an example, the residual amount specifying module 205 may be configured to sequentially specify the end residual amount for the valid regulation range up to the end position of the target valid regulation range. The residual amount specifying module 205 may determine the end position of the valid regulation range from the fact that the mark specifying module 204 specifies the content of the auxiliary sign such as "up to here" indicating the end position of the valid regulation range, or may determine the end position of the valid regulation range from the fact that the specified residual amount is 0.

When specifying the remaining travel distance as the start residual amount, the residual amount specifying module 205 may specify the travel distance from the vehicle position of the car to the start position of the valid regulation range as the remaining travel distance. On the other hand, when specifying the remaining travel distance as the end residual amount, the residual amount specifying module 205 may specify the remaining travel distance by subtracting the travel distance after the car enters the valid regulation range from the distance corresponding to the valid regulation range.

The residual amount specifying module 205 may specify the remaining travel time as the start residual amount or the remaining travel time as the end residual amount by dividing the above-described remaining travel distance by the speed of the car acquired by the speed acquisition module 201. As the speed of the car, an average speed in a predetermined period that can be arbitrarily set may be used.

The priority setting module 206 sets the priority of the traffic regulation mark when the car is located within the valid regulation range indicated by the traffic regulation mark. In other words, the priority setting module 206 specifies the priority of the effective traffic regulation mark in which the car is located within the valid regulation range.

As an example, the priority setting module 206 may be configured to set the priority of the traffic regulation mark depending on the situation of the car with respect to the valid regulation range. Specifically, the priority setting module 206 may be configured to set the priority of the traffic regulation mark with respect to the valid regulation range in which the residual amount specified by the residual amount specifying module 205 is small to be higher. In addition, the priority setting module 206 may be configured to set in accordance with selection from the driver received via the operation device 21. Note that the selection from the driver may be received via a microphone when the voice recognition unit is used in the car. In addition, the priority setting module 206 may be configured to set the priority of the traffic regulation mark in accordance with the type of the traffic regulation mark. In this case, the correspondence relationship between the type of the traffic regulation mark and the priority may be stored in advance in the nonvolatile memory of the vehicle display control device 20, and the priority setting module 206 may set the priority of the traffic regulation mark by referring to the correspondence relationship.

In addition, the priority setting module 206 may be configured to set the priority of the traffic regulation mark depending on the type of the traffic regulation mark and the traveling state of the car. In other words, the priority of the traffic regulation mark may be switched depending on the traveling state of the car. In this case, the priority setting module 206 may be configured to set the priority of the traffic regulation mark estimated to be likely to be a target in the traveling state of the car to be higher. Note that the correspondence relationship between the type of the traffic regulation mark and the priority may be stored in advance in the nonvolatile memory of the vehicle display control device 20, and the priority setting module 206 may set the priority of the traffic regulation mark by referring to the correspondence relationship. Examples of the traveling state of the car include the speed of the car and the presence or absence of a preceding vehicle, or the like. The speed of the car may be acquired by the speed acquisition module 201, and the presence or absence of a preceding vehicle may be determined from the travel environment recognized by the mark recognition module 203.

Examples of setting the priority of the traffic regulation mark depending on the type of the traffic regulation mark and the traveling state of the car include the following. Here, as the traffic regulation mark, "speed limit", "parking prohibited", and "passing prohibited" will be described as examples. For example, when the speed of the car is less than the set value, the priority of "parking prohibited" may be set higher than the priority of "speed limit", and when the speed of the car is equal to or more than the set value, the priority of "speed limit" may be set higher than the priority of "parking prohibited". When there is a preceding vehicle, the priority of "passing prohibited" may be set higher than the priority of "speed limit", and when there is no preceding vehicle, the priority of "speed limit" may be set higher than the priority of "passing prohibited".

Note that the process of setting the priority based on the situation of the car with respect to the valid regulation range will be described in detail later.

The display control module 207 causes the HUD 220 to display the residual amount information indicating the residual amount in the valid regulation range specified by the residual amount specifying module 205 in addition to the regulations information indicating the content of the regulation in the valid regulation range depending on the situation of the car with respect to the valid regulation range. The regulations information may be text information, an icon image, or a combination thereof as long as the regulations information indicates the content of the regulation of the valid regulation range. In the present embodiment, the following description will be continued by taking, as an example, a case where an icon image of a traffic regulation mark corresponding to the content of a regulation in the valid regulation range is used as the regulations information. The residual amount information may be text information, an image such as a bar graph, or a combination thereof as long as the information indicates the residual amount. In the present embodiment, the following description will be continued by taking, as an example, a case where text information indicating the residual amount is used as the residual amount information.

The display control module 207 switches the display area in which the regulations information and the residual amount information are displayed between the proximal display area and the distal display area depending on the situation of the car with respect to the valid regulation range. In addition, the display control module 207 may display the latest regulations information and residual amount information in the distal display area and then transition to display in the proximal display area. However, when the regulations information and the residual amount information are to be displayed in the proximal display area for a plurality of types of traffic regulation marks, the display control module 207 performs adjustment to switch the display of the traffic regulation mark with a lower priority set by the priority setting module 206 from the proximal display area to the distal display area. Furthermore, when the regulations information and the residual amount information in which the display area has been switched from the proximal display area to the distal display area exist for a plurality of types of traffic regulation marks, the display control module 207 displays the information regarding the traffic regulation marks in the distal display area in order in accordance with the priority set by the priority setting module 206. The display control of the regulations information and the residual amount information by the display control module 207 will be described in detail later.

In addition, the display control module 207 may be configured to switch whether to display information indicating the remaining travel distance or information indicating the remaining travel time as the residual amount information in accordance with selection from the driver received via the operation device 21. Note that information indicating both the remaining travel distance and the remaining travel time may be displayed. In addition, the display control module 207 may be configured to be capable of switching the presence or absence of display on the HUD 220 or selectively canceling the display of the regulations information and the residual amount information for a specific traffic regulation mark in accordance with the selection from the driver received via the operation device 21.

Regulation Display Control-Related Process in Vehicle Display Control Device 20

Figure 3:
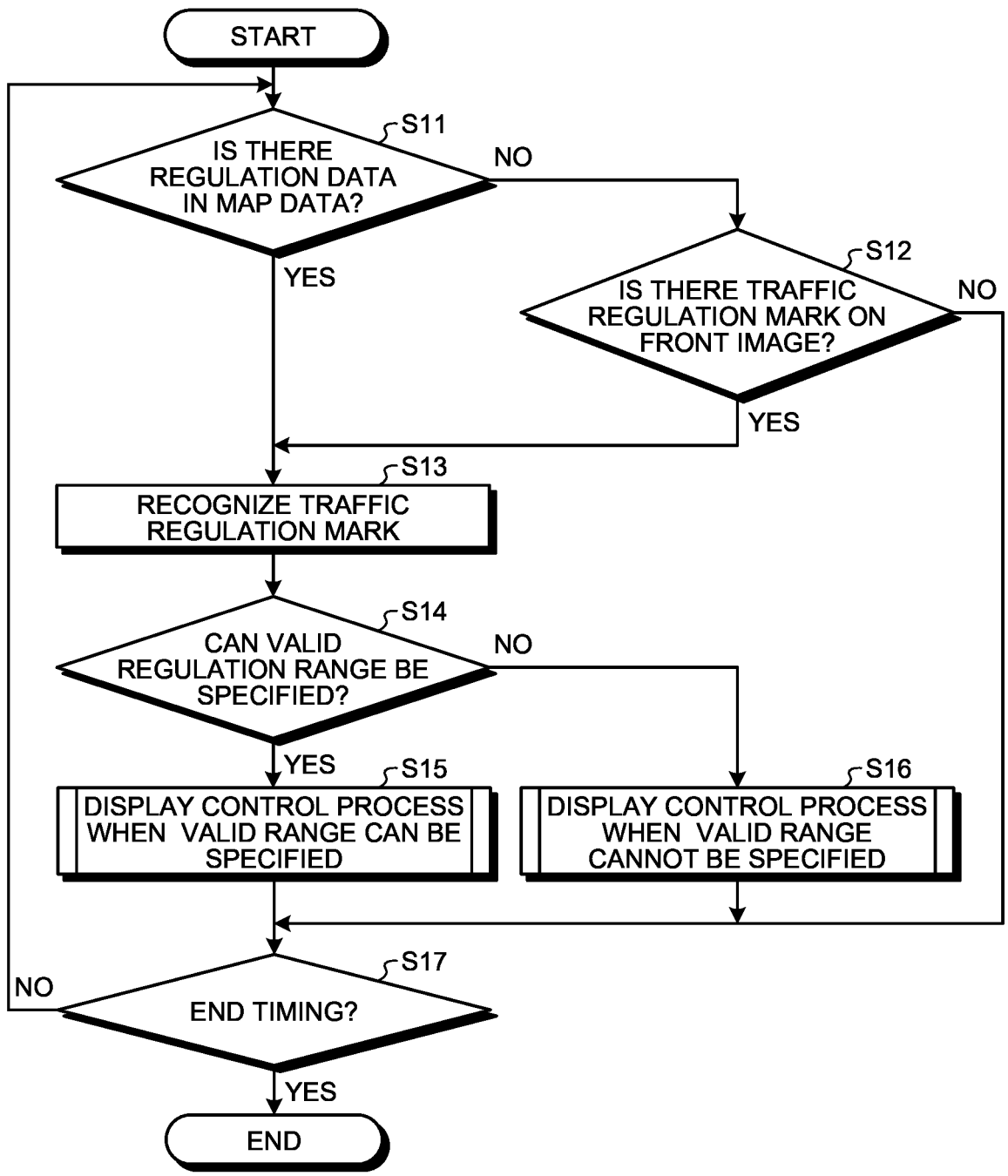
FIG. 3 is a flowchart illustrating an example of a regulation display control-related process of the vehicle display control device according to the embodiment.

Next, an example of a procedure of process related to the control of the display of the traffic regulation mark by the HUD 220 in the vehicle display control device 20 (hereinafter, referred to as regulation display control-related process) will be described with reference to FIGS. 3 to 5. FIG. 3 is a flowchart illustrating an example of a regulation display control-related process of the vehicle display control device 20. In the flowchart of FIG. 3, the process may be started when the power of the HUD 220 is turned on and the function of the HUD 220 is turned on. The function of the HUD 220 may be switched on or off in accordance with an input operation received by the operation device 21. The HUD 220 may be configured to be turned on or off in accordance with on or off of a switch for starting an internal combustion engine or a motor generator of the car (hereinafter, referred to as a power switch).

First, in Step S11, the mark recognition module 203 determines whether there is regulation data associated with a link ahead on the traveling path of the car in the map data. When the mark recognition module 203 determines that the regulation data exists (YES in Step S11), the process proceeds to Step S13. On the other hand, when the mark recognition module 203 determines that the regulation data does not exist (NO in Step S11), the process proceeds to Step S12.

In Step S12, the mark recognition module 203 determines whether the traffic regulation mark can be recognized from the front image. When the mark recognition module 203 determines that the traffic regulation mark can be recognized (YES in Step S12), the process proceeds to Step S13.

In Step S13, the mark recognition module 203 recognizes a traffic regulation mark present ahead on the traveling path of the car. Thereafter, the process proceeds to Step S14.

In Step S14, the mark specifying module 204 determines whether the valid regulation range of the traffic regulation mark recognized in Step S13 can be specified. When the mark specifying module 204 determines that the valid regulation range can be specified (YES in Step S14), the mark specifying module 204 specifies the valid regulation range, and then the process proceeds to Step S15. On the other hand, when the mark specifying module 204 determines that the valid regulation range cannot be specified (NO in Step S14), the process proceeds to Step S16.

In Step S15, a display control process when a valid range can be specified is executed, and thereafter, the process proceeds to Step S17. On the other hand, in Step S16, a display control process when the valid range cannot be specified is executed, and thereafter, the process proceeds to Step S17.

Furthermore, when the mark recognition module 203 determines that the traffic regulation mark cannot be recognized (NO in Step S12), the process proceeds to Step S17.

In Step S17, when it is the end timing of the regulation display control-related process (YES in Step S17), the regulation display control-related process ends. Examples of the end timing of the regulation display control-related process include a case where the power switch of the car is turned off and a case where the function of the HUD 220 is turned off, or the like.

On the other hand, when it is not the end timing of the regulation display control-related process (NO in Step S17), the process returns to Step S11, and the processes in and after Step S11 are executed.

Figure 4:
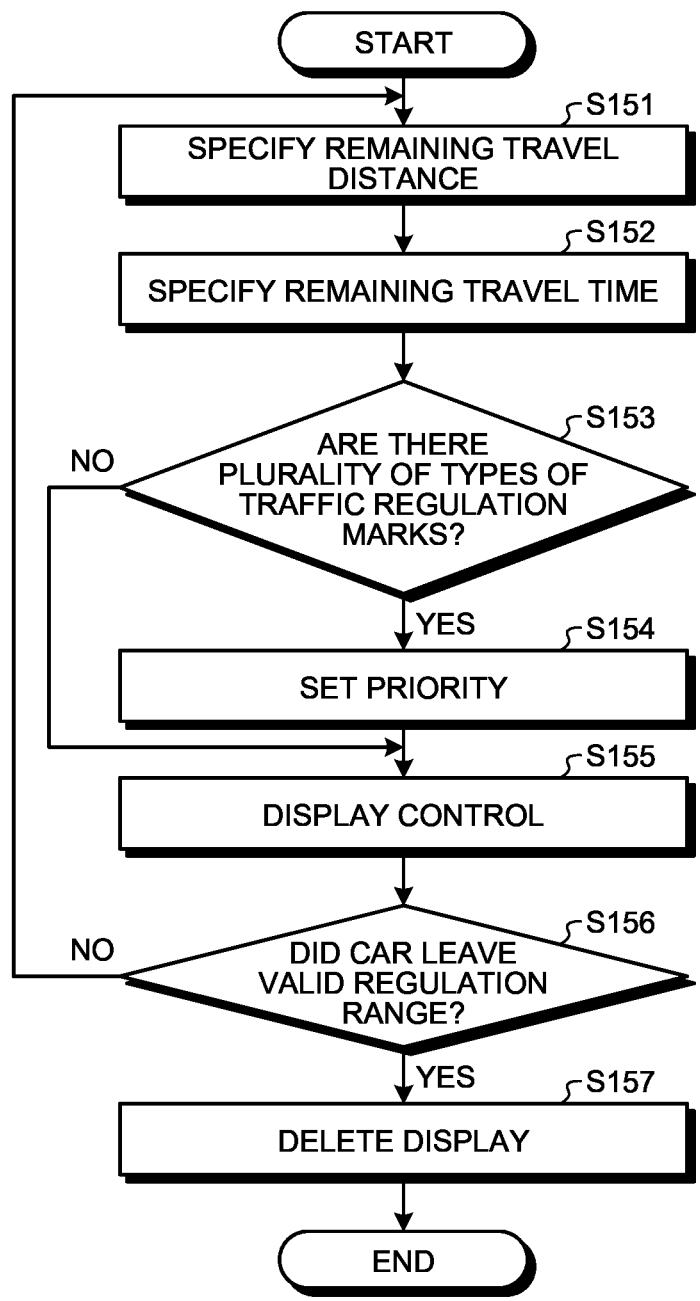
FIG. 4 is a flowchart illustrating an example of a subroutine of a display control process when a valid range can be specified in FIG. 3.

FIG. 4 is a flowchart illustrating an example of a subroutine of the display control process when a valid range can be specified in Step S15 in FIG. 3.

In Step S151, the residual amount specifying module 205 specifies the remaining travel distance as the start residual amount or the end residual amount. Before the car enters the target valid regulation range, the residual amount specifying module 205 specifies the remaining travel distance as the start residual amount for the valid regulation range. On the other hand, after the car enters the valid regulation range, the residual amount specifying module 205 specifies the remaining travel distance as the end residual amount for the valid regulation range. Thereafter, the process proceeds to Step S152.

In Step S152, the residual amount specifying module 205 specifies the remaining travel time as the start residual amount or the end residual amount. Before the car enters the target valid regulation range, the residual amount specifying module 205 specifies the remaining travel time as the start residual amount for the valid regulation range. On the other hand, after the car enters the valid regulation range, the residual amount specifying module 205 specifies the remaining travel time as the end residual amount for the valid regulation range. Thereafter, the process proceeds to Step S153.

In Step S153, the priority setting module 206 determines whether there are a plurality of types of effective traffic regulation marks. In other words, the priority setting module 206 determines whether there are a plurality of types of traffic regulation marks corresponding to the valid regulation range in which the car is located. When the priority setting module 206 determines that there are a plurality of types of effective traffic regulation marks (YES in Step S153), the process proceeds to Step S154.

In Step S154, the priority setting module 206 sets the priority of each of a plurality of types of effective traffic regulation marks. Thereafter, the process proceeds to Step S155.

On the other hand, when the priority setting module 206 determines that there is only one effective traffic regulation mark (NO in Step S153), the process proceeds to Step S155.

In Step S155, the display control module 207 performs display control to cause the HUD 220 to display the regulations information and the residual amount information regarding the effective traffic regulation mark. The display control module 207 displays the display area in which the regulations information and the residual amount information are displayed while switching between the proximal display area and the distal display area depending on the situation of the car with respect to the valid regulation range. When there are a plurality of types of effective traffic regulation marks, the display control module 207 adjusts the display of the regulations information and the residual amount information in accordance with the priority set by the priority setting module 206 in Step S154. Thereafter, the process proceeds to Step S156.

In Step S156, the residual amount specifying module 205 determines whether the car has left the target valid regulation range. When the residual amount specifying module 205 determines that the car has left the target valid regulation range (YES in Step S156), the process proceeds to Step S157.

In Step S157, the display control module 207 performs control to delete the display of the ineffective regulations information and residual amount information for the valid regulation range in which the car has been determined to have left by the residual amount specifying module 205 in Step S156. Here, when there are a plurality of valid regulation ranges in which the car is located and the car has left a part of the valid regulation ranges, the display of the regulations information and the residual amount information for the valid regulation range in which the car has not left is continued.

On the other hand, when the residual amount specifying module 205 determines that the car has not left the target valid regulation range (NO in Step S156), the process returns to Step S151, and the processes in and after Step S151 are executed.

Figure 5:
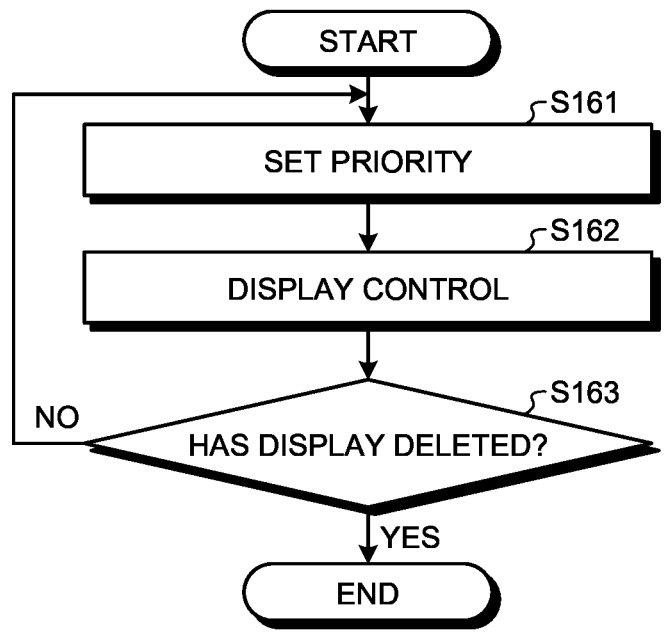
FIG. 5 is a flowchart illustrating an example of a subroutine of a display control process when a valid range cannot be specified in FIG. 3.

FIG. 5 is a flowchart illustrating an example of a subroutine of the display control process when the valid range cannot be specified in Step S16 in FIG. 3.

In Step S161, the priority setting module 206 sets the priority of the effective traffic regulation mark. When there are a plurality of types of effective traffic regulation marks, the priority setting module 206 sets the priority of each of the plurality of types of effective traffic regulation marks. Thereafter, the process proceeds to Step S162.

In Step S162, the display control module 207 performs display control to cause the HUD 220 to display the regulations information and the residual amount information regarding the effective traffic regulation mark. The display control module 207 displays the display area in which the regulations information and the residual amount information are displayed while switching between the proximal display area and the distal display area depending on the situation of the car with respect to the valid regulation range. Furthermore, the display control module 207 adjusts the display of the regulations information and the residual amount information in accordance with the priority set by the priority setting module 206 in Step S161. Note that the display control here also includes deleting the display. For example, the display control module 207 deletes the display of the regulations information and the residual amount information depending on the situation of the car with respect to the valid regulation range. Thereafter, the process proceeds to Step S163.

In Step S163, in a case where the display of the regulations information and the residual amount information is deleted by the display control of the display control module 207 in Step S162 (YES in Step S163), the display control process when the valid range cannot be specified ends, and the process proceeds to Step S17 in FIG. 4. On the other hand, when the display of the regulations information and the residual amount information is not deleted by the display control module 207 (NO in Step S163), the process returns to Step S161, and the processes in and after Step S161 are executed. Here, in a case where there is a plurality of effective traffic regulation marks and the display of the regulations information and the residual amount information for a part of the effective traffic regulation marks is deleted, the display of the other regulations information and the residual amount information is continued.

Setting of Priority Based on Situation of Car with Respect to Valid Regulation Range The priority setting module 206 may be configured to set the priority of the traffic regulation mark depending on the situation of the car with respect to the valid regulation range. In particular, when the end residual amount cannot be specified by the residual amount specifying module 205, the priority setting module 206 can set the priority of the traffic regulation mark depending on the situation of the car with respect to the valid regulation range, and the display control module 207 can control the display of the regulations information and the like on the basis of the priority. Hereinafter, the setting of the priority based on the situation of the car with respect to the valid regulation range by the priority setting module 206 will be described with an example.

(1) Setting of Priority Based on Travel Distance from Start Position of Valid Regulation Range The priority setting module 206 can set the priority of the traffic regulation mark on the basis of the travel distance of the car from the start position of the valid regulation range. Specifically, when the travel distance of the car from the start position of the valid regulation range is equal to or more than the set value, the priority setting module 206 can set the priority of the traffic regulation mark to be lower than that in a case where the travel distance is less than the set value. In addition, the priority setting module 206 may be configured to set the priority of the traffic regulation mark to be lower stepwise using a plurality of set values, for example, to set the priority of the traffic regulation mark to be lower than that of the case where the travel distance is less than the first set value when the travel distance of the car from the start position of the valid regulation range is equal to or more than the first set value, and to set the priority of the traffic regulation mark to be further lower when the travel distance is equal to or more than the second set value which is larger than the first set value. This set value may vary in accordance with the type of the traffic regulation mark. In addition, this set value may be set in advance on the basis of an average distance of a valid regulation range of the traffic regulation mark on the actual road. Note that this set value may be input and set in advance by the driver.

(2) Setting Priority Based on Travel Time from Start Position of Valid Regulation Range The priority setting module 206 can set the priority of the traffic regulation mark on the basis of the travel time of the car from the start position of the valid regulation range. Specifically, when the travel time of the car from the start position of the valid regulation range is equal to or more than the set value, the priority setting module 206 can set the priority of the traffic regulation mark to be lower than that in a case where the travel time is less than the set value. In addition, the priority setting module 206 may be configured to set the priority of the traffic regulation mark to be lower stepwise using a plurality of set values, for example, to set the priority of the traffic regulation mark to be lower than that of the case where the travel time is less than the first set value when the travel time of the car from the start position of the valid regulation range is equal to or more than the first set value, and to set the priority of the traffic regulation mark to be further lower when the travel time is equal to or more than the second set value which is larger than the first set value. This set value may vary in accordance with the type of the traffic regulation mark, or may vary depending on the road situation such as a traffic jam. That is, in a case where the road on which the car is traveling is congested, the time required to travel the same distance is longer than that in a case of not being congested. Therefore, in such a case, the set value of the travel time may be set longer than that in a case of not being congested. In addition, this set value can be set in advance on the basis of an average travel time of a valid regulation range of the traffic regulation mark on the actual road. Note that this set value may be input and set in advance by the driver.

(3) Setting of Priority Based on Intersection and Number of Signals

The priority setting module 206 can set the priority of the traffic regulation mark on the basis of the number of intersections or the number of signals through which the car has passed between the start position of the valid regulation range and the current position of the car. In addition, the priority setting module 206 can set the priority of the traffic regulation mark on the basis of the number of both intersections and signals through which the car has passed between the start position of the valid regulation range and the current position of the car. Specifically, when the number of intersections or the like through which the car has passed between the start position of the valid regulation range and the current position of the car is equal to or more than the set value, the priority setting module 206 can set the priority of the traffic regulation mark to be lower than that in a case where the travel time is less than the set value. In addition, the priority setting module 206 may be configured to lower stepwise the priority using a plurality of set values. For example, when the number of intersections or the like through which the car has passed between the start position of the valid regulation range and the current position of the car is equal to or more than the first set value, the priority setting module 206 may set the priority of the traffic regulation mark to be lower than that in a case where the travel time is less than the first set value, and may set the priority of the traffic regulation mark further lower when the number of intersections or the like is equal to or more than the second set value which is larger than the first set value. This set value may vary in accordance with the type of the traffic regulation mark. In addition, this set value may be set in advance on the basis of the average number of intersections of a valid regulation range of the traffic regulation mark on the actual road. Note that this set value may be input and set in advance by the driver.

(4) Setting of Priority Based on Boundaries Between Prefectures or Municipalities The priority setting module 206 can set the priority of the traffic regulation mark on the basis of the presence of a boundary between prefectures or municipalities. Specifically, when the car passes through a boundary between prefectures or municipalities while the car is traveling within the valid regulation range indicated by the traffic regulation mark, the priority setting module 206 can set the priority of the traffic regulation mark lower than that before the car passed through the boundary. In addition, the priority setting module 206 may be configured to lower the priority stepwise in accordance with the number of boundaries passed through. Note that the priority setting module 206 does not need to apply this setting on a specific road. For example, when the car is traveling on a road that passes through a boundary between prefectures or municipalities for a plurality of times in a short section, the priority setting module 206 does not need to set the priority of the traffic regulation mark to be lower even if the car passes through the boundary.

Note that the boundary between prefectures or municipalities is an example of a boundary between administrative divisions that can be specified from map data, for example. Therefore, the definition of the boundary used for setting the priority may vary depending on countries or regions.

(5) Setting of Priority Based on Selection from Driver

The priority setting module 206 can set the priority of the traffic regulation mark on the basis of the selection from the driver received via the operation device 21. Specifically, when the driver inputs selection of the traffic regulation mark via the operation device 21 while traveling within the valid regulation range indicated by the traffic regulation mark, the priority setting module 206 can set the priority of the traffic regulation mark lower than that before the selection. In addition, the priority setting module 206 may be configured to lower the priority stepwise in accordance with selection from the driver.

(6) Setting of Priority Based on Detection of Line-of-Sight of Driver

The priority setting module 206 can set the priority of the traffic regulation mark on the basis of the line of sight of the driver detected by a line-of-sight sensor. Specifically, when determining that the driver has recognized the regulations information or the like displayed by the HUD 220, the priority setting module 206 can set the priority of the traffic regulation mark lower than that before the determination on the basis of the line of sight of the driver detected by the line-of-sight sensor.

(7) Setting of Priority Based on Specification of Valid Regulation Range

The priority setting module 206 can set the priority of the traffic regulation mark on the basis of the valid regulation range specified by the mark specifying module 204. Specifically, in a case where the valid regulation range is specified by the mark specifying module 204 while the display control process when the valid range cannot be specified is performing after it is determined in Step S14 in FIG. 3 that the valid regulation range cannot be specified, the priority setting module 206 can set the priority of the traffic regulation mark on the basis of the end residual amount specified by the residual amount specifying module 205. Note that, in this case, the display control process when a valid range can be specified (processes in and after Step S151 in FIG. 4) may be executed.

Display Control Based on Set Priority

As illustrated in the flowcharts of FIGS. 3 and 5, in the vehicle display control device 20 according to the present embodiment, when the valid regulation range of the traffic regulation mark cannot be specified by the residual amount specifying module 205, the display control module 207 controls the display of the regulations information and the like on the basis of the priority set by the priority setting module 206. Hereinafter, the display control by the display control module 207 will be described with examples.

Content of the display control by the display control module 207 includes (A) deleting the display, (B) reducing the size of the display, (C) brightening the display (lowering the luminance), (D) changing the color of the display, (E) switching the display area of the display, (F) increasing the size of the display, (G) darkening the display (raising the luminance), (H) emphasizing the display by a lamp, and the like. The display control module 207 executes one or a plurality of controls from among these on the basis of the priority set by the priority setting module 206.

For example, in the vehicle display control device 20, the priority settings (1) to (7) exemplified above and the display controls (A) to (H) may be associated in advance. That is, a correspondence relationship between executing "(A) Deleting of Display" and "(1) Setting of Priority based on Travel Distance from Start Position of Valid Regulation Range" may be set in advance. In this case, the correspondence relationship between the priority setting and the content of the display control may be stored in advance in the non-volatile memory of the vehicle display control device 20, and the display control module 207 may control the display related to the traffic regulation mark by referring to this correspondence relationship.

Display Control Example of One Type of Effective Traffic Regulation Mark

Figure 6:
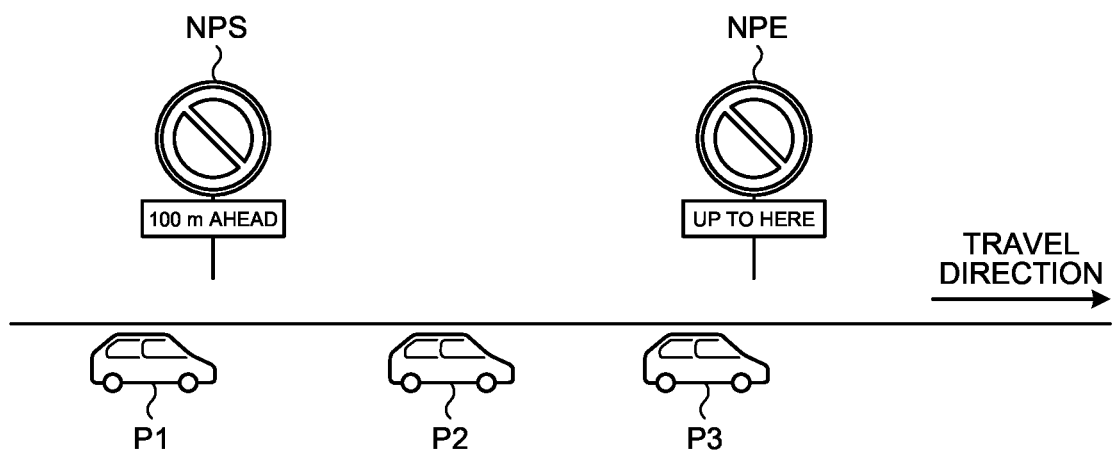
FIG. 6 is a schematic diagram illustrating an example of a situation of a car with respect to a valid regulation range.
Figure 7:
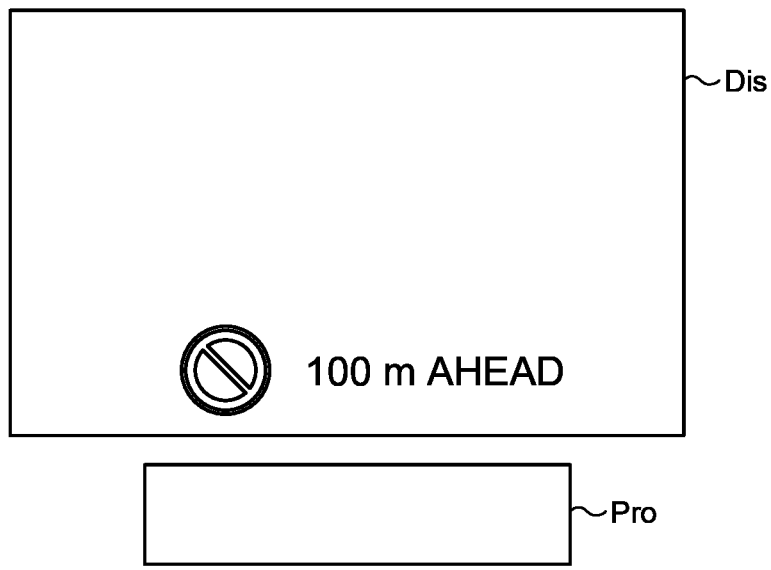
FIG. 7 is a diagram illustrating an example of display of regulations information and residual amount information in a proximal display area and a distal display area at a vehicle position P1 in FIG. 6.
Figure 8:
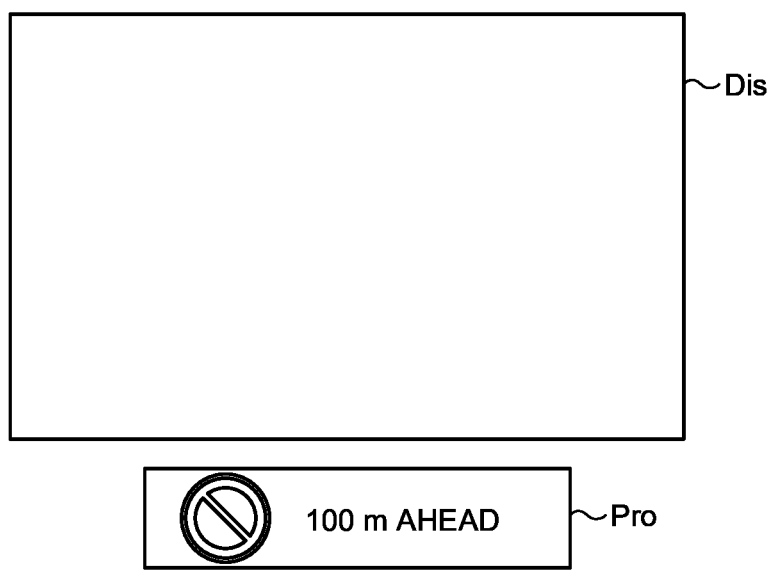
FIG. 8 is a diagram illustrating another example of display of regulations information and residual amount information in the proximal display area and the distal display area at the vehicle position P1 in FIG. 6.

An example of the display control by the display control module 207 in a case where there is one type of effective traffic regulation mark will be described with reference to FIGS. 6 to 10. FIG. 6 is a schematic diagram illustrating an example of a situation of the car with respect to a valid regulation range. FIGS. 7 to 10 are diagrams illustrating examples of display of the regulations information and the residual amount information in a proximal display area Pro and a distal display area Dis depending on the traveling status of the car in FIG. 6. FIGS. 7 and 8 are diagrams illustrating an example of display at a vehicle position P1, FIG. 9 is a diagram illustrating a vehicle position P2, and FIG. 10 is a diagram illustrating an example of display at a vehicle position P3. In FIGS. 6 to 10, a case where the traffic regulation mark is "parking prohibited" and the valid regulation range is 100 m will be described as an example.

FIG. 6 illustrates a sign NPS such as a regulatory sign "parking prohibited" and an auxiliary sign provided at a start position of a valid regulation range. In addition, FIG. 6 illustrates a sign NPE such as a regulatory sign "parking prohibited" and an auxiliary sign provided at an end position of the valid regulation range. FIG. 6 illustrates vehicle positions P1 to P3 of the car. The vehicle position P1 indicates a vehicle position at which the sign NPS and the front portion of the car are located at the same position, that is, a vehicle position at the time when the car enters the valid regulation range (hereinafter, referred to as the valid regulation range of "parking prohibited") corresponding to the regulatory sign of "parking prohibited". The vehicle position P2 indicates a vehicle position when the car is located between the sign NPS and the sign NPE, that is, a vehicle position when the car is located within the valid regulation range of "parking prohibited". The vehicle position P3 indicates a vehicle position when the car passes by the sign NPE, that is, a vehicle position at the time of leaving the valid regulation range of "parking prohibited". The same applies to FIGS. 11 to 21 described below.

When the car enters the valid regulation range of "parking prohibited" (vehicle position P1 in FIG. 6), the display control module 207 displays, as illustrated in FIG. 7, in the distal display area Dis, an icon image imitating a sign of "parking prohibited" as the regulations information and a text such as "100 m ahead" as the residual amount information indicating the end residual amount. As a result, it is possible to cause the driver to recognize the newly specified traffic regulation mark. The regulations information and the residual amount information at this time are displayed on the lower side of the distal display area Dis so as not to disturb the field of view of the driver. However, this display is temporary, and the display control module 207 then switches the display of the regulations information and the residual amount information to the display in the proximal display area Pro as illustrated in FIG. 8.

After the car enters the valid regulation range of "parking prohibited" until the time of leaving (vehicle position P2 in FIG. 6), as illustrated in FIG. 9, an icon image imitating a sign of "parking prohibited" and a text indicating an end residual amount such as "50 m remaining" are displayed in the proximal display area Pro. The text indicating the end residual amount may be updated and displayed in accordance with the end residual amount sequentially specified by the residual amount specifying module 205. The same applies to a display control example in a case where there are two types of effective traffic regulation marks and a display control example in a case where there are three or more types of effective traffic regulation marks described below.

Then, at the time when the car leaves the valid regulation range of "parking prohibited" (vehicle position P3 in FIG. 6), the display control module 207 displays an icon image imitating a sign of "parking prohibited" and a text such as "up to here" as an end residual amount in the proximal display area Pro, as illustrated in FIG. 10. That is, the traffic regulation mark of "parking prohibited" becomes ineffective. The text to be displayed as the end residual amount may be the content recognized from the auxiliary sign provided at the end point of the valid regulation range. Furthermore, the text to be displayed as the end residual amount may be "0 m remaining" or the like. The same applies to a display control example in a case where there are two types of effective traffic regulation marks and a display control example in a case where there are three or more types of effective traffic regulation marks described below.

When the car has left the valid regulation range of "parking prohibited", the display control module 207 deletes the regulations information and the residual amount information displayed in the proximal display area Pro until then. That is, the display of the regulations information and the residual amount information corresponding to the valid regulation range the car has left is terminated. Note that the display control module 207 may be configured to display, residual amount information indicating a start residual amount for the valid regulation range together with the regulations information in the distal display area Dis before the car enters the valid regulation range for the purpose of giving notice of entry into the valid regulation range to the driver.

Display Control Example of Two Types of Effective Traffic Regulation Marks

Figure 11:
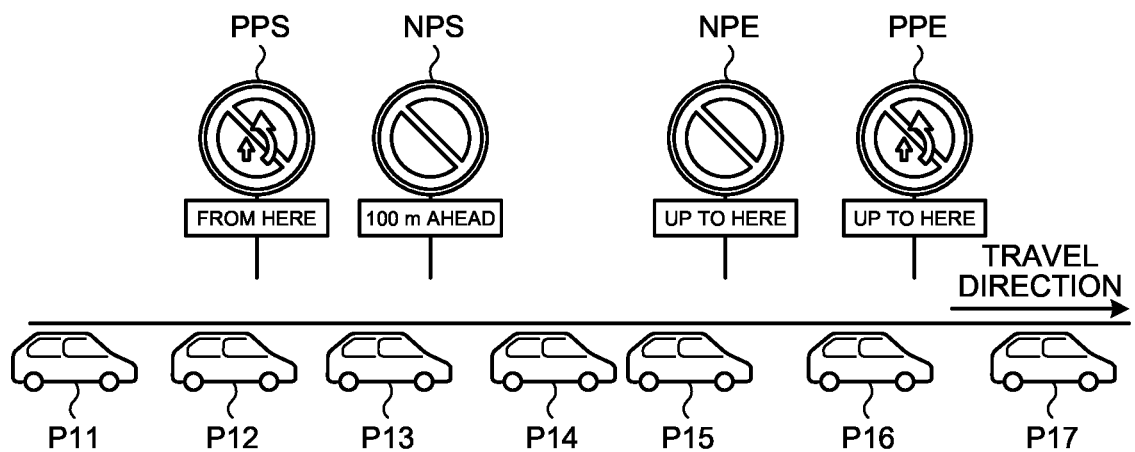
FIG. 11 is a schematic diagram illustrating another example of the situation of the car with respect to the valid regulation range.
Figure 19:
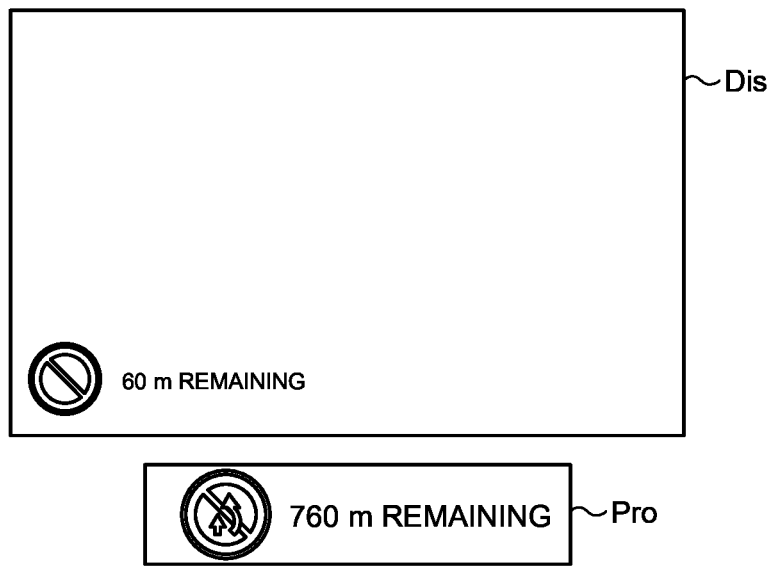
FIG. 19 is a diagram illustrating another example of display of regulations information and residual amount information in the proximal display area and the distal display area at the vehicle position P14 in FIG. 11.
Figure 20:
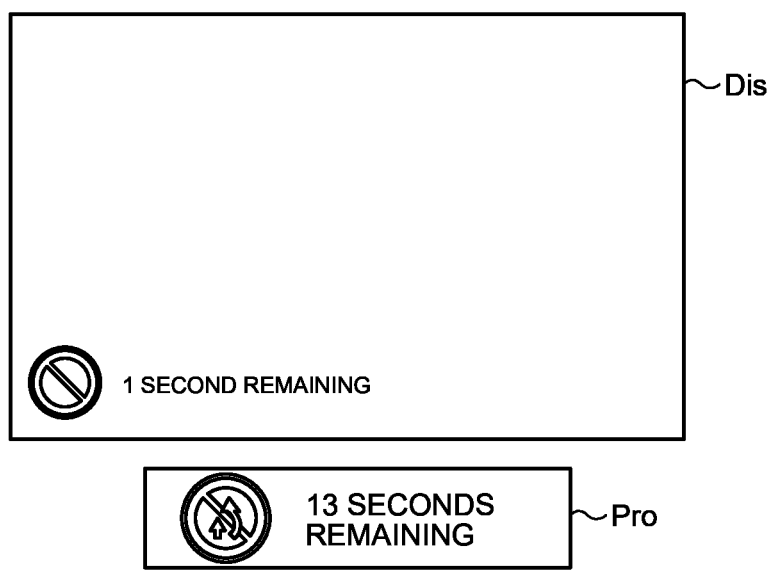
FIG. 20 is a diagram illustrating another example of display of regulations information and residual amount information in the proximal display area and the distal display area at the vehicle position P14 in FIG. 11.

An example of display control by the display control module 207 in a case where there are two types of effective traffic regulation marks will be described with reference to FIGS. 11 to 20. In FIGS. 11 to 20, a case where the traffic regulation marks are "passing prohibited" and "parking prohibited", the valid regulation range of the "passing prohibited" is 800 m, and the valid regulation range of the "parking prohibited" is 100 m will be described as an example. In addition, in FIGS. 11 to 20, a case where the valid regulation ranges of "parking prohibited" overlap in the middle of the valid regulation range of "passing prohibited" will be described as an example. FIG. 11 is a schematic diagram illustrating an example of the situation of the car with respect to the valid regulation range. FIGS. 12 to 20 are diagrams illustrating examples of display of the regulations information and the residual amount information in the proximal display area Pro and the distal display area Dis depending on the traveling status of the car in FIG. 11. Specifically, FIGS. 12 to 18 are diagrams illustrating examples of respective display at vehicle positions P11 to P17, and FIGS. 19 and 20 are diagrams illustrating another example of display at the vehicle position P14.

In the example illustrated in FIG. 11, the sign NPS is a sign such as a regulatory sign "parking prohibited" and an auxiliary sign provided at the start position of the valid regulation range of "parking prohibited". In addition, the sign NPE indicates signs such as a regulatory sign "parking prohibited" and an auxiliary sign provided at an end point position of this valid regulation range. Furthermore, in the example illustrated in FIG. 11, the sign PPS indicates signs such as a regulatory sign "passing prohibited" and auxiliary sign provided at the start position of the valid regulation range of "passing prohibited". In addition, the sign PPE indicates signs such as a regulatory sign "passing prohibited" and an auxiliary sign provided at an end point position of the valid regulation range.

FIG. 11 illustrates vehicle positions P11 to P17 of the car. The vehicle position P11 indicates a vehicle position before the car enters the valid regulation range of "passing prohibited". The vehicle position P12 indicates a vehicle position where the sign PPS and the front portion of the car are located at the same position, that is, a vehicle position at a point of time when the car enters the valid regulation range (hereinafter, referred to as a valid regulation range of "passing prohibited") corresponding to the regulatory sign of "passing prohibited". The vehicle position P13 indicates a vehicle position where the sign NPS and the front portion of the car are located at the same position, that is, a vehicle position when the car enters the valid regulation range of "parking prohibited". The vehicle position P14 indicates a vehicle position when the car is located within both the valid regulation range of "passing prohibited" and the valid regulation range of "parking prohibited". The vehicle position P15 indicates a vehicle position when the car passes by the sign NPE, that is, a vehicle position at the time of leaving the valid regulation range of "parking prohibited". The vehicle position P16 indicates a vehicle position when the car passes by the sign PPE, that is, a vehicle position at the time of leaving the valid regulation range of "passing prohibited". The vehicle position P17 indicates a vehicle position after leaving the valid regulation range of "passing prohibited".

Figure 12:
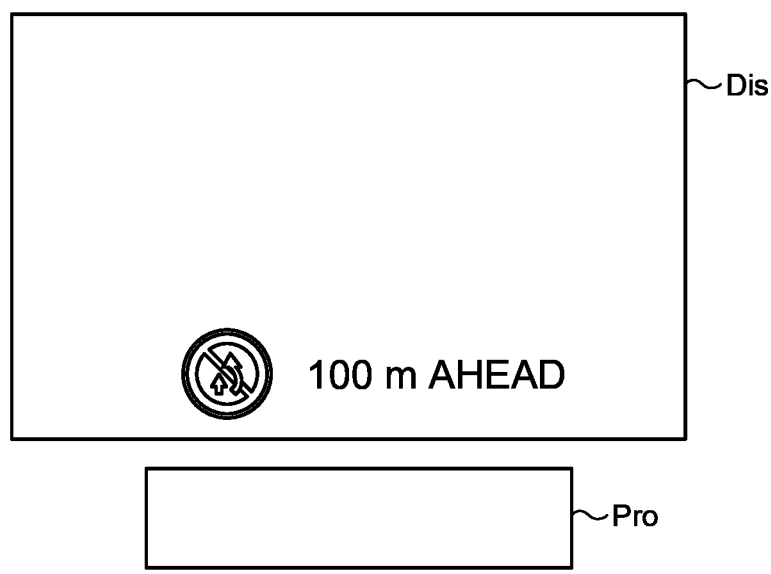
FIG. 12 is a diagram illustrating an example of display of regulations information and residual amount information in the proximal display area and the distal display area at a vehicle position P11 in FIG. 11.

Before the car enters the valid regulation range of "passing prohibited" (vehicle position P11 in FIG. 11), as illustrated in FIG. 12, the display control module 207 displays an icon image imitating a sign of "passing prohibited" as the regulations information and a text such as "100 m ahead" as the residual amount information indicating the start residual amount in the distal display area Dis.

Figure 13:
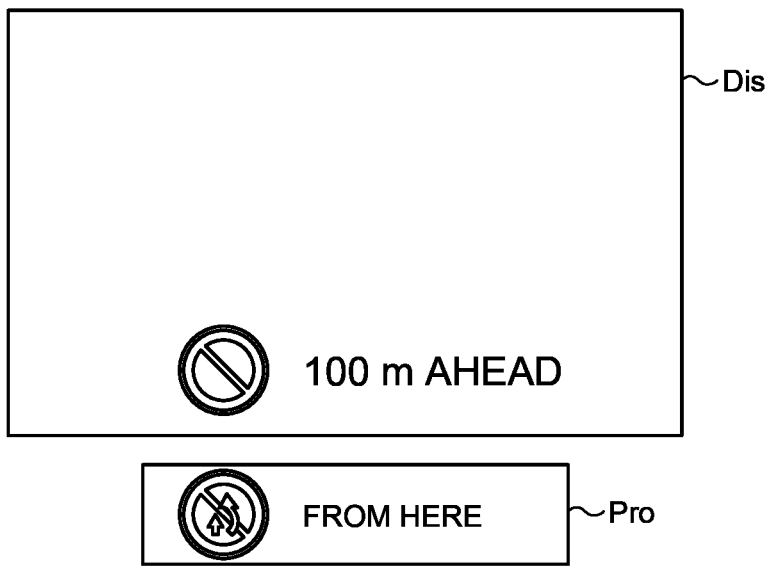
FIG. 13 is a diagram illustrating an example of display of regulations information and residual amount information in the proximal display area and the distal display area at a vehicle position P12 in FIG. 11.

When the car enters the valid regulation range of "passing prohibited" (vehicle position P12 in FIG. 7), the display control module 207 displays, in the proximal display area Pro, an icon image imitating a sign of "passing prohibited" as the regulations information and a text indicating that the valid regulation range starts, such as "from here", as illustrated in FIG. 13. The display control module 207 displays, in the distal display area Dis, an icon image imitating a sign of "parking prohibited" as the regulations information and a text such as "100 m ahead" as the residual amount information indicating the start residual amount.

Note that the display control module 207 may be configured to display a text such as "800 m ahead" as the residual amount information indicating the end residual amount instead of displaying the text indicating the start of the valid regulation range in the proximal display area Pro. In addition, it may be configured to display a text such as "from here" temporarily and then to switch to display a text such as "800 m ahead".

Figure 14:
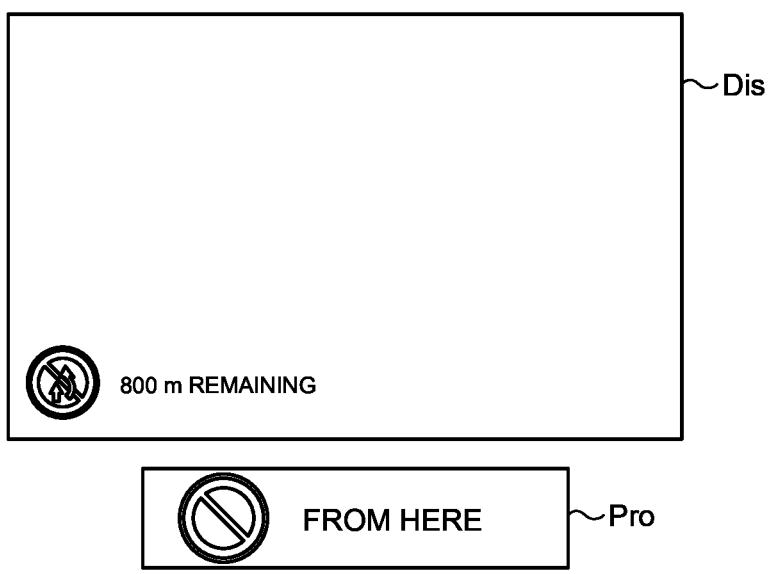
FIG. 14 is a diagram illustrating an example of display of regulations information and residual amount information in the proximal display area and the distal display area at a vehicle position P13 in FIG. 11.

Subsequently, when the car enters the valid regulation range of "parking prohibited" (vehicle position P13 in FIG. 11), the display control module 207 displays, in the proximal display area Pro, an icon image imitating a sign of "parking prohibited" as the regulations information corresponding to the newly effective traffic regulation mark, and a text indicating that the valid regulation range starts such as "from here", as illustrated in FIG. 14. The display control module 207 displays, in the distal display area Dis, an icon image imitating a sign of "passing prohibited" as the regulations information corresponding to the traffic regulation mark that has already been effective, and text such as "800 m remaining" as the residual amount information indicating the end residual amount. Note that the display control module 207 may be configured, along with displaying the information corresponding to the traffic regulation mark that is newly effective in the proximal display area Pro, to transition displaying the information corresponding to the traffic regulation mark that has already been effective from in the proximal display area Pro to in the distal display area Dis.

Figure 15:
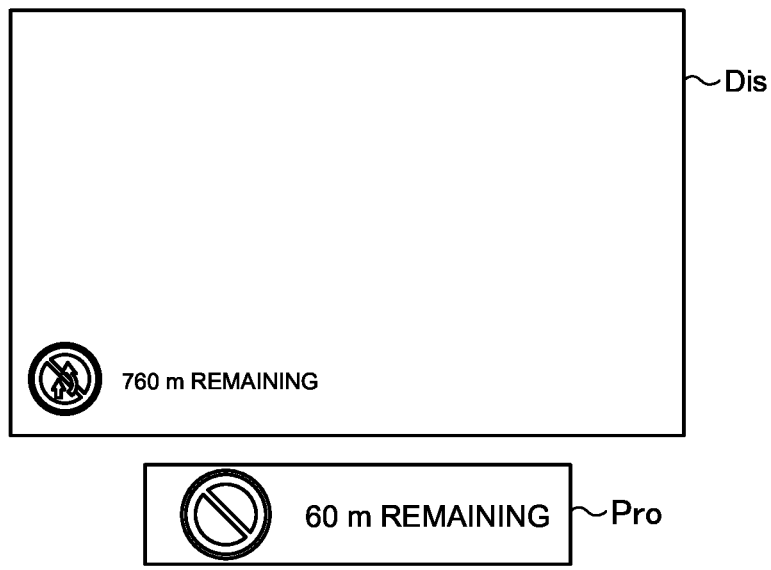
FIG. 15 is a diagram illustrating an example of display of regulations information and residual amount information in the proximal display area and the distal display area at a vehicle position P14 in FIG. 11.

When the car is located in an area where the valid regulation range of "passing prohibited" and the valid regulation range of "parking prohibited" overlap with each other (vehicle position P14 in FIG. 11), the display control module 207 displays, as illustrated in FIG. 15, in the proximal display area Pro, an icon image imitating a sign of "parking prohibited" corresponding to the valid regulation range of "parking prohibited" having a smaller end residual amount, and a text indicating the end residual amount such as "60 m remaining". On the other hand, the display control module 207 displays, in the distal display area Dis, an icon image imitating a sign of "passing prohibited" corresponding to the valid regulation range of "passing prohibited" having a larger end residual amount, and a text indicating the end residual amount such as "760 m remaining". Accordingly, since the regulations information and the residual amount information for the valid regulation range having a smaller end residual amount are preferentially displayed in the proximal display area Pro, the driver can more easily recognize the situation of the car for each valid regulation range indicated by the plurality of types of traffic regulation marks.

The display control module 207 may be configured to display information on a traffic regulation mark with a higher priority set by the priority setting module 206 in the proximal display area Pro, and display information on a traffic regulation mark with a lower priority in the distal display area Dis. When the display area for displaying the regulations information and the residual amount information on the traffic regulation mark with lower priority is switched from the proximal display area Pro to the distal display area Dis, the display control module 207 displays the regulations information and the residual amount information to be displayed in the distal display area Dis in a more inconspicuous manner than the case where the regulations information and the residual amount information are initially displayed in the distal display area Dis.

The term "initially" as used herein refers to a point in time when the car enters the valid regulation range for the traffic regulation mark. Examples of the inconspicuous manner include a display mode in which the size to be displayed is reduced, a display mode in which the luminance to be displayed is reduced, and a display mode in which the position to be displayed is set to a position more deviated from the center of the distal display area Dis. Accordingly, it is possible to make it easier for the driver to distinguish the information to be displayed in the distal display area Dis at the time of entering the valid regulation range from the information initially displayed while preventing the field of view of the driver from being obstructed.

Figure 16:
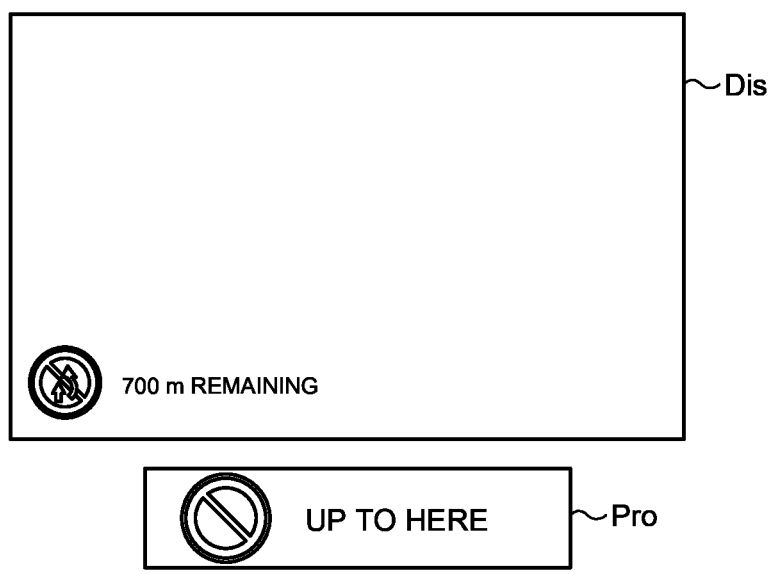
FIG. 16 is a diagram illustrating an example of display of regulations information and residual amount information in the proximal display area and the distal display area at a vehicle position P15 in FIG. 11.

Then, at the time when the car leaves the valid regulation range of "parking prohibited" (vehicle position P15 in FIG. 11), the display control module 207 displays an icon image imitating a sign of "parking prohibited" and a text such as "up to here" as an end residual amount in the proximal display area Pro, as illustrated in FIG. 16. That is, the traffic regulation mark of "parking prohibited" becomes ineffective. The display control module 207 continuously displays the regulations information and the residual amount information corresponding to the valid regulation range of "passing prohibited" in the distal display area Dis. As a specific example, the display control module 207 displays an icon image imitating a sign of "passing prohibited" and a text indicating the end residual amount such as "700 m remaining".

Figure 17:
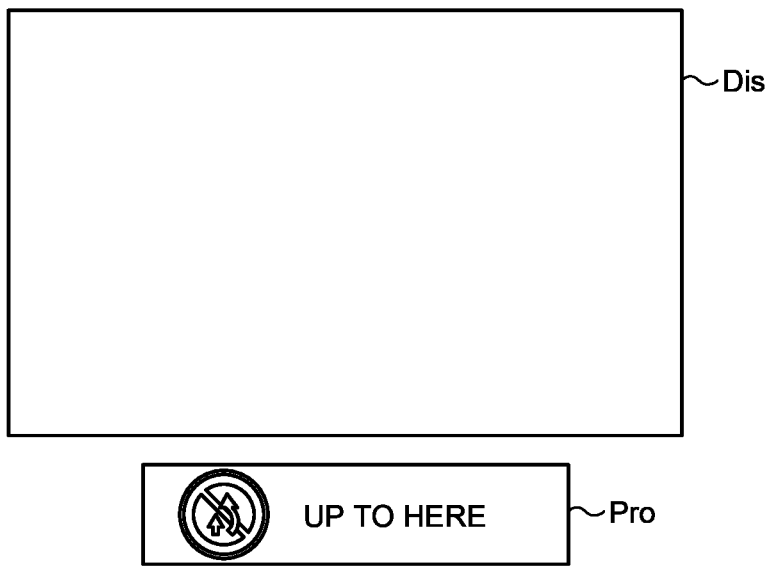
FIG. 17 is a diagram illustrating an example of display of regulations information and residual amount information in the proximal display area and the distal display area at a vehicle position P16 in FIG. 11.

At the time when the car leaves the valid regulation range of "passing prohibited" (vehicle position P16 in FIG. 11), the display control module 207 displays an icon image imitating a sign of "passing prohibited" and a text such as "up to here" as an end residual amount in the proximal display area Pro, as illustrated in FIG. 17. That is, the traffic regulation mark of "passing prohibited" becomes ineffective. The display control module 207 ends the display of the regulations information and the residual amount information corresponding to the valid regulation range of "passing prohibited" in the distal display area Dis.

Figure 18:
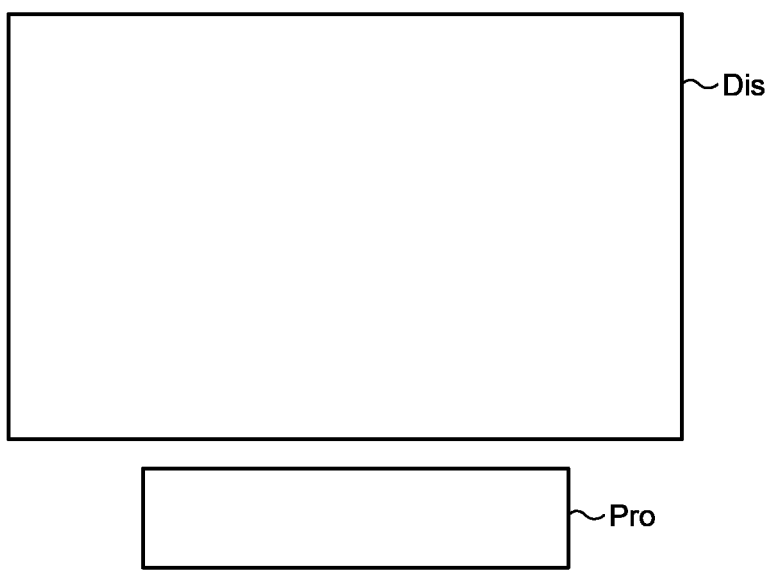
FIG. 18 is a diagram illustrating an example of display of regulations information and residual amount information in the proximal display area and the distal display area at a vehicle position P17 in FIG. 11.

When the car has left the valid regulation range of "passing prohibited" (vehicle position P17 in FIG. 11), the display control module 207 deletes the regulations information and the residual amount information displayed in the proximal display area Pro, as illustrated in FIG. 18. In addition, since there is no effective traffic regulation mark, the display control module 207 does not display the regulations information and the residual amount information in the distal display area Dis as illustrated in FIG. 18.

Note that, FIG. 15 illustrates an example of a case of further increasing the priority of the traffic regulation mark having a smaller end residual amount, but the present invention is not necessarily limited thereto. Depending on the setting of the priority in the priority setting module 206, as illustrated in FIG. 19, while the regulations information and the residual amount information corresponding to the valid regulation range of "passing prohibited" is displayed in the proximal display area Pro, the regulations information and the residual amount information corresponding to the valid regulation range of "parking prohibited" may be displayed in the distal display area Dis.

In addition, in FIGS. 7 to 10 and FIGS. 12 to 19, the remaining travel distance is displayed as the start residual amount and the end residual amount, but the present invention is not necessarily limited thereto. For example, as illustrated in FIG. 20, the remaining travel time may be displayed as the residual amount.

Figure 21:
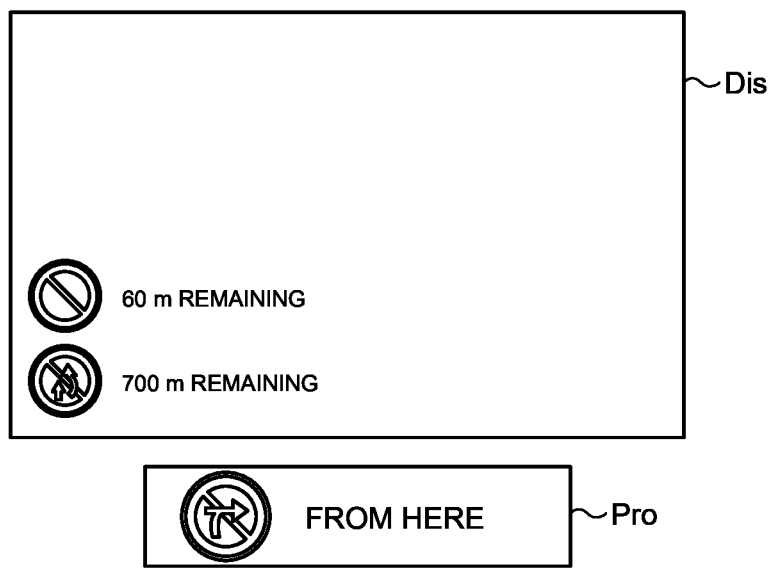
FIG. 21 is a diagram illustrating another example of display of regulations information and residual amount information in the proximal display area and the distal display area depending on the traveling status of the car.

Display Control Example of Three or More Types of Effective Traffic Regulation Marks An example of display control by the display control module 207 in a case where there are three or more types of effective traffic regulation marks will be described with reference to FIG. 21. FIG. 21 is a diagram illustrating another example of display of the regulations information and the residual amount information in the proximal display area Pro and the distal display area Dis depending on the traveling status of the car. In FIG. 21, a description will be given using an example of a case where there are three types of traffic regulation marks of "passing prohibited", "parking prohibited", and "vehicle crossing prohibited". Note that the case other than the case where the valid regulation ranges of the three types of traffic regulation marks overlap with each other is similar to the case where there are two or more types of effective traffic regulation marks described above, and thus the description thereof will be omitted.

When the car is located in an area where the valid regulation range of "passing prohibited", the valid regulation range of "parking prohibited", and the valid regulation range of "vehicle crossing prohibited" overlap with each other, the display control module 207 displays, in the proximal display area Pro, the regulations information and the residual amount information on the traffic regulation mark with the highest priority set by the priority setting module 206. On the other hand, for the remaining traffic regulation marks, the display control module 207 may be configured to arrange the regulations information and the residual amount information in order higher priority set by the priority setting module 206 at a position closer to the proximal display area Pro in the distal display area Dis.

Accordingly, the driver can more easily recognize the situation of the car with respect to the respective valid regulation ranges indicated by the three or more kinds of traffic regulation marks by arranging the traffic regulation marks in the order of the set priorities. For example, in a case where the traffic regulation mark with respect to the valid regulation range with smaller end residual amount is set with a higher priority, the information regarding the valid regulation range with smaller end residual amount is displayed at a position closer to the proximal display area Pro, so that the driver can intuitively recognize the order of the residual amount for each valid regulation range.

In addition, the display control module 207 may display the regulations information and the residual amount information for the traffic regulation mark with a higher priority set by the priority setting module 206 in a larger size or in a higher luminance to achieve a similar effect.

Note that, in the above-described example, the description has been given by exemplifying "passing prohibited", "parking prohibited", and "vehicle crossing prohibited" as the traffic regulation marks, but the traffic regulation marks are not necessarily limited thereto. The traffic regulation mark may be applied to another traffic regulation mark such as "speed limit" as long as a regionally valid range is defined in the regulation indicated by the traffic regulation mark.

SUMMARY

As described above, in the present embodiment, the vehicle display control device 20 includes the mark recognition module 203, the mark specifying module 204, and the display control module 207. When the mark specifying module 204 cannot specify the valid regulation range, the display control module 207 switches the display of the regulations information upon satisfying the predetermined condition.

As a result, with respect to the traffic regulation mark of which the valid regulation range is not specified and the end residual amount is not specified, it is possible to suppress the continuation of the display of the regulations information and the like even if the car leaves the valid regulation range. Therefore, according to the present embodiment, the driver can more easily recognize the situation of the car with respect to the valid regulation range, and display of more appropriate regulations information and the like for the driver can be realized.

In addition, the vehicle display control device 20 according to the present embodiment further includes the priority setting module 206, and if the valid regulation range cannot be specified by the mark specifying module 204, the display control module 207 switches the display of the regulations information on the basis of the setting of the priority by the priority setting module 206 upon satisfying the predetermined condition.

As a result, even for the traffic regulation mark of which the valid regulation range is not specified and the end residual amount is not specified, the display control is performed on the basis of the priority set by the priority setting module 206, and it is possible to suppress the continuation of the display of the regulations information and the like even if the car leaves the valid regulation range. Therefore, according to the present embodiment, the driver can more easily recognize the situation of the car with respect to the valid regulation range, and display of more appropriate regulations information and the like for the driver can be realized.

Furthermore, according to the present embodiment, the display area in which the regulations information and the residual amount information are displayed is switched depending on the situation (that is, the positional relationship) of the car with respect to the valid regulation range. As a result, the driver can more easily recognize the situation of the car with respect to the valid regulation range by the transition of the display area in which the regulations information and the residual amount information are displayed. As a specific example, at the time of entering the valid regulation range, the regulations information and the residual amount information are first displayed in the distal display area Dis, and then the display is transitioned to the proximal display area Pro, so that the driver can more easily recognize that the vehicle has newly entered the valid regulation range.

Furthermore, according to the present embodiment, when the car is located in an area where the valid regulation ranges indicated by the plurality of types of traffic regulation marks overlap each other, the display area for displaying the regulations information and the residual amount information for each valid regulation range is switched depending on the situation of the car. As a result, the driver can more easily recognize the situation of the car with respect to each valid regulation range. For example, by displaying the regulations information and the residual amount information in the distal display area Dis at first when the vehicle enters the valid regulation range, the driver can more easily recognize which valid regulation range the vehicle has newly entered. In addition, by displaying the regulations information and the residual amount information for each valid regulation range in the display area, the driver can more easily recognize the situation of the car with respect to each valid regulation range.

In the present embodiment, the example has been given for the case where the predetermined condition is set in advance such that the display of the regulations information is switched on the basis of the satisfaction of the predetermined condition when the valid regulation range is not specified, but the present invention is not limited thereto. The predetermined condition may be set in advance such that the display of the regulations information is switched on the basis of the non-satisfaction of the predetermined condition when the valid regulation range is not specified.

Other Embodiments

In the above embodiment, an example has been described in which the priority settings (1) to (7) listed in the "Setting of Priority based on Situation of Car with respect to Valid Regulation Range" and the display controls (A) to (H) listed in the "Display Control based on Set Priority" are associated in advance. However, one or more types of setting of the priority and one or more types of display control may be associated.

For example, one type of priority setting (1) and two types of display controls (A) and (B) may be associated with each other. In this case, the size of the display of the regulations information or the like may be reduced when the travel distance of the car from the start position of the valid regulation range is equal to or more than the first set value, and the display of the regulations information or the like may be deleted when the travel distance is equal to or more than the second set value which is larger than the first set value.

As another example, two types of priority settings (1) and (3) and two types of display controls (A) and (B) may be associated with each other. In this case, the size of the display of the regulations information or the like may be reduced when the travel distance of the car from the start position of the valid regulation range is equal to or more than the first set value, and the display of the regulations information or the like may be deleted when the number of intersections through which the car passes between the start position of the valid regulation range and the current position of the car is equal to or more than the second set value.

In addition, each of the above-described priority settings (1) to (7) may be weighted, and may be associated with the above-described display controls (A) to (H) on the basis of the weighting. In this case, for example, display control of, in ascending order of weighting, (A) Deleting the display, (C) Brightening the display, and (B) Reducing the size of the display, may be associated. For example, regarding the setting of the priority, what is considered here is a case in which a higher weighting is set in (5) Setting of Priority based on Selection from Driver than in (1) Setting of Priority based on Travel Distance. In this case, the display control associated with the weighting may be performed such that the display size of the regulations information or the like is reduced when the travel distance of the car from the start position of the valid regulation range is equal to or more than the set value, and the display of the regulations information or the like is deleted when the driver selects the traffic regulation mark. Furthermore, the weighting and the association of the display control depending on the weighting may vary in accordance with the type of the traffic regulation mark.

In addition, the association between the priority setting and the display control, the weighting regarding the priority setting, and the display control described above may be set on the basis of information transmitted from the server 7 to the car. For example, the information transmitted from the server 7 is a driver model generated on the basis of the travel history of the driver of the car, and the vehicle display control device 20 may perform, on the basis of the driver model, the association between the priority setting and the display control, and the weighting regarding the priority setting. In this case, the vehicle display control device 20 can perform display control more suitable for the driver of the car based on the driving tendency of the driver of the car. Specifically, when the driver of the car has a strong tendency to exceed the speed limit, the vehicle display control device 20 sets the weighting of the priority setting for the road sign with the speed limit to be high on the basis of the driver model indicating this tendency. As a result, the display control based on the high priority is performed for the display of the regulations information and the like, and the excess of the speed limit by the driver can be suppressed, that is, the display control suitable for the driver can be performed. Note that the driver model referred to herein is not limited to a model for an individual driver or a single car, and may be a model obtained by modeling a behavior pattern or the like of a group of people or a large number of vehicles.

As another example, the information transmitted from the server 7 is data of a traffic violation or a traffic accident in the past on the route on which the car is traveling, and the vehicle display control device 20 may perform the association between the priority setting and the display control, and the weighting regarding the priority setting, on the basis of the data. As a result, for example, the weighting of the setting of the priority for the traffic regulation mark strongly related to the cause of the traffic violation or the traffic accident can be set high, and the traffic violation and the traffic accident can be suppressed.

As still another example, the information transmitted from the server 7 is information of display control in another vehicle traveling on the route on which the car is traveling, and the vehicle display control device 20 may execute display control with respect to the regulations information or the like on the basis of the information of the display control. As a result, it is possible to perform display control such as deleting display of unnecessary regulations information or the like without input or the like by the driver of the car via the operation device 21.

Furthermore, in the above embodiment, description has been given with an example of the configuration in which the plurality of display areas displaying the regulations information and the residual amount information are display areas of virtual images each corresponding to each of the plurality of projection areas of the HUD 220. However, the present disclosure is not necessarily limited to the exemplary embodiment. For example, the plurality of display areas displaying the regulations information and the residual amount information may include the display area by the HUD 220 and the display area of the display device 22 of a type other than the HUD 220. The display device 22 used as the display device 22 of a type other than the HUD 220 is preferably the combination meter, the CID, or the like described above so that the movement of the line of sight of the driver can be suppressed to be small.

For example, the display area of the HUD 220 may be used as the distal display area Dis of the above embodiment, and the display area of the combination meter or the CID may be used as the proximal display area Pro. Note that a combination meter or a CID display area may be used as the distal display area Dis, and among the display areas of the combination meter and the CID, a display region that is not used as the distal display area Dis may be used as the proximal display area Pro. In this case, it is preferable that the display area of the CID and the display area of the combination meter are arranged in the vertical direction from the viewpoint of suppressing the movement of the line of sight of the driver.

Furthermore, in the above embodiment, description has been given with an example of a case in which there are two display areas capable of displaying the regulations information and the residual amount information, but the present invention is not necessarily limited thereto. For example, there may be three or more display areas capable of displaying the regulations information and the residual amount information. Also in this case, after the regulations information and the residual amount information are displayed in the display area displaying the image seen more distally from the driver seated on the driver's seat among the plurality of display areas, the display area displaying the regulations information and the residual amount information may be switched to the display area displaying the image seen more proximally from the driver seated on the driver's seat.

The program executed by the vehicle display control device 20 according to the above embodiments is provided by being recorded in a computer-readable recording medium such as a CD-ROM, a flexible disk (FD), a CD-R, or a digital versatile disk (DVD) as a file in an installable format or an executable format.

Furthermore, the program executed by the vehicle display control device 20 according to the above embodiments may be stored in a computer connected to a network such as the Internet and provided by being downloaded via the network. In addition, the program executed by the vehicle display control device 20 of the above embodiments may be provided or distributed via a network such as the Internet. In addition, the program executed by the vehicle display control device 20 of the above embodiments may be provided by being incorporated in advance in ROM or the like.

Supplement

As is apparent from the above embodiments, the present disclosure includes the following aspects. In the following, reference numerals are given in parentheses only to clearly indicate the correspondence with the embodiment.

A vehicle display control device (20) according to the first aspect includes a regulation recognition module (203), a valid range specifying module (204), and a display control module (207). The regulation recognition module (203) recognizes a traffic regulation mark indicating a traffic regulation provided on the traveling path of the car. A valid range specifying module (204) specifies a valid regulation range that is a valid range of the regulation indicated by the traffic regulation mark based on the traffic regulation mark recognized by the regulation recognition module (203). A display control module (207) controls a display device (22) mounted on the car so as to display, in a display area, regulations information that is content of a regulation indicated by a traffic regulation mark recognized by the regulation recognition module (203). When the valid range specifying module (204) cannot specify the valid regulation range, the display control module (207) switches the display of the regulations information upon satisfying the predetermined condition. According to the first aspect, when the valid range cannot be specified, it is possible to prevent the regulations information from being continuously displayed without being switched after leaving the valid range. Therefore, the driver can easily recognize the situation of the car with respect to the valid range.

A vehicle display control device (20) according to the second aspect can be implemented in combination with the first aspect. In the second aspect, the display area is a plurality of display areas having different positions. When the valid range specifying module cannot specify the valid regulation range, the display control module (207) switches the display area where the regulations information is displayed upon satisfying the predetermined condition. According to the second aspect, when the valid range cannot be specified, it is possible to prevent the regulations information from being continuously displayed in the display area with high priority after leaving the valid range. Therefore, the driver can easily recognize the situation of the car with respect to the valid range.

A vehicle display control device (20) according to the third aspect can be implemented by a combination with the first or second aspects. In the third aspect, the vehicle display control device (20) further includes a residual amount specifying module (205). The residual amount specifying module (205) specifies a residual amount that is at least one of a remaining travel distance and a remaining travel time required from the vehicle position of the car to the end of the valid regulation range. A display control module (207) displays, in addition to the regulations information, residual amount information indicating the residual amount specified by the residual amount specifying module (205) in a display area. When the valid range specifying module cannot specify the valid regulation range, the display control module (207) switches the display of the residual amount information upon satisfying the predetermined condition. According to the third aspect, when the valid range cannot be specified, it is possible to prevent the display of the residual amount information from being continuously displayed without being switched after leaving the valid range. Therefore, the driver can more easily recognize the situation of the car with respect to the valid range.

A vehicle display control device (20) according to the fourth aspect can be implemented by a combination with any one of the first to third aspects. In the fourth aspect, the valid range specifying module (204) specifies the valid regulation range on the basis of an image acquired by an image sensor having an imaging range of at least a predetermined range in front of the car. The case where the valid range specifying module (204) has failed to specify the valid regulation range is a case where the valid regulation range has failed to be specified on the basis of the image acquired by the image sensor. According to the fourth aspect, when the valid range cannot be specified on the basis of the image acquired by the image sensor, it is possible to prevent the residual amount information from being continuously displayed in the display area with high priority after leaving the valid range. Therefore, the driver can more easily recognize the situation of the car with respect to the valid range.

A vehicle display control device (20) according to the fifth aspect can be implemented by a combination with any one of the first to fourth aspects. In the fifth aspect, the predetermined condition is that the travel distance from the start position of the valid regulation range to the vehicle position of the car is equal to or more than the set value. According to the fifth aspect, when the travel distance of the car from the start position of the valid regulation range is equal to or more than the set value, the display area where the regulations information is displayed can be switched. Therefore, the driver can more easily recognize the situation of the car with respect to the valid range.

A vehicle display control device (20) according to the sixth aspect can be implemented by a combination with any one of the first to fourth aspects. In the sixth aspect, the predetermined condition is that the time required from the start position of the valid regulation range to the vehicle position of the car is equal to or more than the set value. According to the sixth aspect, when the travel time of the car from the start position of the valid regulation range is equal to or more than the set value, the display area where the regulations information is displayed can be switched. Therefore, the driver can more easily recognize the situation of the car with respect to the valid range.

A vehicle display control device (20) according to the seventh aspect can be implemented by a combination with any one of the first to fourth aspects. In the seventh aspect, the predetermined condition is that the number of intersections or signals existing between the start position of the valid regulation range and the vehicle position of the car is equal to or more than the set value. According to the seventh aspect, when the number of intersections or signals through which the car has passed from the start position of the valid regulation range is equal to or more than the set value, the display area where the regulations information is displayed can be switched. Therefore, the driver can more easily recognize the situation of the car with respect to the valid range.

A vehicle display control device (20) according to the eighth aspect can be implemented by a combination with any one of the first to fourth aspects. In the eighth aspect, the predetermined condition is that the car has passed a boundary between prefectures or municipalities. According to the eighth aspect, it is possible to switch the display area where the regulations information is displayed when the car passes through the boundary between prefectures or municipalities. Therefore, the driver can more easily recognize the situation of the car with respect to the valid range.

A vehicle display control device (20) according to the ninth aspect can be implemented by a combination with any one of the first to fourth aspects. In the ninth aspect, the predetermined condition is that selection from the user is accepted. According to the ninth aspect, the display area where the regulations information is displayed can be switched on the basis of the intention of the driver. Therefore, the display control of the regulations information can be realized in accordance with the intention of the driver.

A vehicle display control device (20) according to the tenth aspect can be implemented by a combination with any one of the first to fourth aspects. In the tenth aspect, the predetermined condition is that it is determined that the user has recognized the regulations information on the basis of the detection result of the line-of-sight sensor that detects the direction of the line of sight of the user. According to the tenth aspect, it is possible to switch the display area where the regulations information already recognized by the driver is displayed. Therefore, the regulations information that the driver has to recognize can be preferentially displayed.

A vehicle display control method according to the eleventh aspect includes a regulation recognition step, a valid range specification step, and a display control step. In the regulation recognition step, a traffic regulation mark indicating a traffic regulation provided on the traveling path of the car is recognized. The valid range specification step specifies a valid regulation range which is a valid range of the regulation indicated by the traffic regulation mark on the basis of the traffic regulation mark recognized by the regulation recognition step. The display control step controls the display device (22) mounted on the car so as to display, in the display area, the regulations information that is the content of the regulation indicated by the traffic regulation mark recognized in the regulation recognition step. The display control step switches the display of the regulations information upon satisfying the predetermined condition when the valid regulation range cannot be specified by the valid range specifying step. According to the eleventh aspect, when the valid range cannot be specified, it is possible to prevent the regulations information from being continuously displayed without being switched after leaving the valid range. Therefore, the driver can easily recognize the situation of the car with respect to the valid range.

The vehicle display control device according to the present disclosure can appropriately display the regulations information.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A vehicle display control device, comprising:
   a memory; and
   a processor coupled to the memory and configured to:
      recognize a traffic regulation mark provided on a traveling path of a car, the traffic regulation mark indicating a traffic regulation;
      specify a valid regulation range used as a valid range of regulation indicated by the traffic regulation mark based on the recognized traffic regulation mark; and
      control a display device mounted on the car to display regulations information on a first one of a plurality of display areas, the plurality of display areas having different positions, the regulations information including contents of regulation indicated by the recognized traffic regulation mark,
   wherein the processor is configured to switch the first one of the plurality of display areas on which the regulations information is displayed to a second one of the plurality of display areas in response to a predetermined condition being satisfied in a case where the valid regulation range is not specified.

2. The vehicle display control device according to claim 1, wherein the processor is further configured to:
   specify a residual amount of at least one of a remaining travel distance or a remaining travel time taken from a vehicle position of the car to an end position of the valid regulation range;
   control the display device to display the regulations information and residual amount information indicating the specified residual amount on the first one of the plurality of display areas; and
   switch displaying the residual amount information into another one of the plurality of display areas upon satisfying the predetermined condition in the case where the valid regulation range is not specified.

3. The vehicle display control device according to claim 2, wherein
the processor is configured to specify the valid regulation range based on an image captured by an image sensor having an imaging range covering at least a predetermined range in front of the car, and
the case where the valid regulation range is not specified includes the valid regulation range not being specified based on the image captured by the image sensor.

4. The vehicle display control device according to claim 1, wherein
the processor is configured to specify the valid regulation range based on an image captured by an image sensor having an imaging range covering at least a predetermined range in front of the car, and
the case where the valid regulation range is not specified includes the valid regulation range not being specified based on the image captured by the image sensor.

5. The vehicle display control device according to claim 1,
wherein the predetermined condition includes a travel distance from a start position of the valid regulation range to a vehicle position of the car being equal to or more than a set value.

6. The vehicle display control device according to claim 1,
wherein the predetermined condition includes a time taken from a start position of the valid regulation range to a vehicle position of the car being equal to or more than a set value.

7. The vehicle display control device according to claim 1,
wherein the predetermined condition includes a number of intersections or traffic signals existing between a start position of the valid regulation range and a vehicle position of the car being equal to or more than a set value.

8. The vehicle display control device according to claim 1,
wherein the predetermined condition includes the car passing a boundary between prefectures or municipalities.

9. The vehicle display control device according to claim 1,
wherein the predetermined condition includes a selection from a user being accepted.

10. The vehicle display control device according to claim 1,
wherein the predetermined condition includes a determination on a user recognition of the regulations information being performed based on a detection result by a line-of-sight sensor configured to detect a direction of a line of sight of a user.

11. A vehicle display control method, comprising:
recognizing a traffic regulation mark provided on a traveling path of a car, the traffic regulation mark indicating a traffic regulation;
specifying a valid regulation range used as a valid range of regulation indicated by the traffic regulation mark based on the traffic regulation mark recognized in the recognizing; and
controlling a display device mounted on the car to display regulations information on a first one of a plurality of display areas, the plurality of display areas having different positions, the regulations information including contents of regulation indicated by the traffic regulation mark recognized in the recognizing,
wherein the controlling includes switching the first one of the plurality of display areas on which the regulations information is displayed to a second one of the plurality of display areas in response to a predetermined condition being satisfied in a case where the valid regulation range is not specified in the specifying.

12. A vehicle display control device, comprising:
a memory; and
a processor coupled to the memory and configured to:
recognize a traffic regulation mark provided on a traveling path of a car, the traffic regulation mark indicating traffic regulation;
specify a valid regulation range used as a valid range of regulation indicated by the traffic regulation mark based on the recognized traffic regulation mark; and
control a display device mounted on the car to display regulations information on a first one of a plurality of display areas, the plurality of display areas having different positions, the regulations information including contents of regulation indicated by the recognized traffic regulation mark,
wherein the processor is configured to switch the first one of the plurality of display areas on which the regulations information is displayed to a second one of the plurality of display areas in response to a predetermined condition being satisfied in a case where the valid regulation range is not specified, and
the predetermined condition indicates that a number of intersections or traffic signals existing between a start position of the valid regulation range and a vehicle position of the car is equal to or more than a set value.

13. The vehicle display control device according to claim 12, wherein
the processor is further configured to switch one of the plurality of display areas used to display the regulations information to another one of the plurality of display areas upon satisfying the predetermined condition in the case where the valid regulation range is not specified.

14. The vehicle display control device according to claim 13, wherein the processor is configured to:
specify a residual amount of at least one of a remaining travel distance or a remaining travel time taken from a vehicle position of the car to an end position of the valid regulation range;
control the display device to display the regulations information and residual amount information indicating the specified residual amount on the one of the plurality of display areas; and
switch displaying the residual amount information to the another one of the plurality of display areas upon satisfying the predetermined condition in the case where the valid regulation range is not specified.

15. The vehicle display control device according to claim 13, wherein
the processor is further configured to specify the valid regulation range based on an image captured by an image sensor having an imaging range covering at least a predetermined range in front of the car, and
the case where the valid regulation range is not specified includes the valid regulation range not being specified based on the image captured by the image sensor.

16. The vehicle display control device according to claim 12, wherein the processor is further configured to:
specify a residual amount of at least one of a remaining travel distance or a remaining travel time taken from a vehicle position of the car to an end position of the valid regulation range;

control the display device to display the regulations information and residual amount information indicating the specified residual amount on one of the plurality of display areas; and switch displaying the residual amount information to another one of the plurality of display areas upon satisfying the predetermined condition in the case where the valid regulation range is not specified.

17. The vehicle display control device according to claim 12, wherein the processor is further configured to specify the valid regulation range based on an image captured by an image sensor having an imaging range covering at least a predetermined range in front of the car, and the case where the valid regulation range is not specified includes the valid regulation range not being specified based on the image captured by the image sensor.

* * * * *